US010937289B2

(12) United States Patent
King et al.

(10) Patent No.: US 10,937,289 B2
(45) Date of Patent: Mar. 2, 2021

(54) MERCHANDISE ACTIVITY SENSOR SYSTEM AND METHODS OF USING SAME

(71) Applicant: Indyme Solutions, LLC, San Diego, CA (US)

(72) Inventors: Greg King, San Diego, CA (US); Derek Morikawa, San Diego, CA (US); Barry Baldwin, San Diego, CA (US); Bill Kepner, San Diego, CA (US); Joe Budano, San Diego, CA (US); Steve Deal, San Diego, CA (US)

(73) Assignee: Indyme Solutions, LLC, San Diego, CA (US)

( * ) Notice: Subject to any disclaimer, the term of this patent is extended or adjusted under 35 U.S.C. 154(b) by 0 days.

(21) Appl. No.: 16/051,388

(22) Filed: Jul. 31, 2018

(65) Prior Publication Data

US 2019/0088096 A1 Mar. 21, 2019

Related U.S. Application Data

(63) Continuation-in-part of application No. 15/269,774, filed on Sep. 19, 2016, now Pat. No. 10,037,662, (Continued)

(51) Int. Cl.
| G08B 13/196 | (2006.01) |
| G08B 13/14 | (2006.01) |
| G06K 9/00 | (2006.01) |
| G06Q 10/08 | (2012.01) |
| G08B 29/18 | (2006.01) |

(Continued)

(52) U.S. Cl.
CPC ... *G08B 13/19665* (2013.01); *G06K 9/00288* (2013.01); *G06K 9/00771* (2013.01); *G06Q 10/087* (2013.01); *G08B 13/1436* (2013.01); *G08B 13/2445* (2013.01); *G08B 29/185* (2013.01); *G08B 13/19613* (2013.01); *G08B 15/008* (2013.01); *H04N 5/2252* (2013.01)

(58) Field of Classification Search
CPC ............... H04N 7/183; H04N 5/2252; G08B 13/19665; G08B 13/1436; G06K 9/00288; G06K 9/00771; G06Q 10/087
See application file for complete search history.

(56) References Cited

U.S. PATENT DOCUMENTS

| 6,542,731 B1 * | 4/2003 | Alos | H04W 12/1206 |
| | | | 455/411 |
| 7,007,301 B2 * | 2/2006 | Crosbie | G06F 21/552 |
| | | | 707/999.202 |

(Continued)

*Primary Examiner* — Hoi C Lau
(74) *Attorney, Agent, or Firm* — Lewis Kohn & Walker LLP; David M. Kohn

(57) ABSTRACT

Apparatus and systems using merchandise activity sensors for increasing the awareness of interactivity with merchandise on retail store displays (shelves, peg hooks, merchandise pushers, and other Point of Purchase displays) in order to facilitate more effective customer service, reduce theft and to provide additional analysis data related to merchandise/shopper interaction. Additionally, apparatus and systems for the conversion of cameras from passive to active deterrence devices aware of events occurring the environment. More particularly, the present invention pertains to awareness of behaviors often related to potential theft activity.

15 Claims, 11 Drawing Sheets

Related U.S. Application Data which is a continuation-in-part of application No. PCT/US2015/051098, filed on Sep. 18, 2015, which is a continuation-in-part of application No. 14/629,233, filed on Feb. 23, 2015, now Pat. No. 9,697,709.

(60) Provisional application No. 62/052,026, filed on Sep. 18, 2014.

(51) Int. Cl.
*G08B 13/24* (2006.01)
*H04N 5/225* (2006.01)
*G08B 15/00* (2006.01)

(56) References Cited

U.S. PATENT DOCUMENTS

| | | | | |
|---|---|---|---|---|
| 8,866,612 | B1* | 10/2014 | Foster | G08B 13/2462 340/568.1 |
| 2010/0001872 | A1* | 1/2010 | Lian | G01V 15/00 340/661 |
| 2013/0263291 | A1* | 10/2013 | Ohman | G08B 13/1418 726/35 |
| 2014/0225734 | A1* | 8/2014 | Rasband | G08B 13/246 340/572.1 |
| 2014/0362223 | A1* | 12/2014 | LaCroix | H04N 7/183 348/150 |
| 2019/0088096 | A1* | 3/2019 | King | G08B 13/19665 |

* cited by examiner

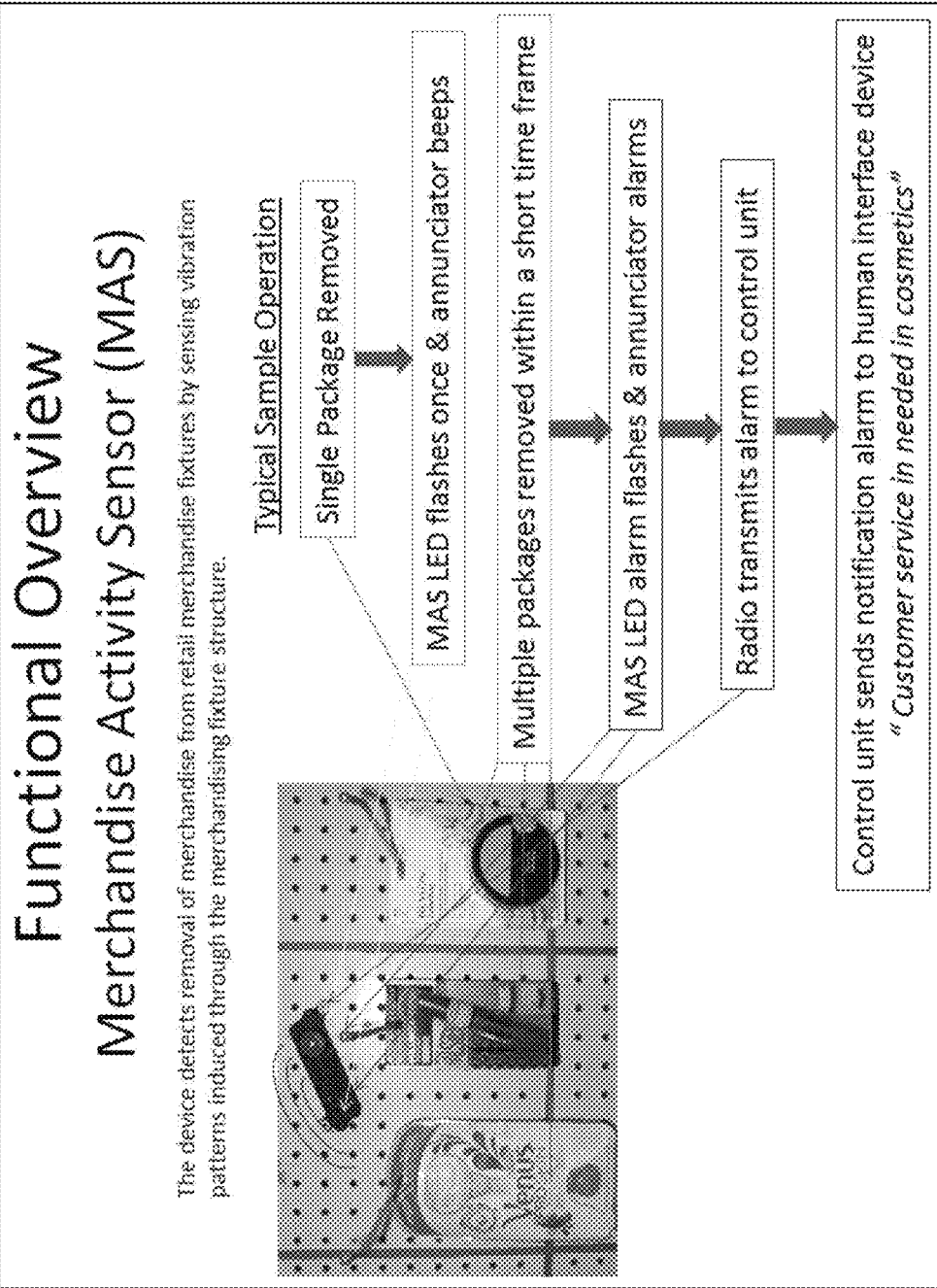
Figure 1: MAS Basic Functional Overview

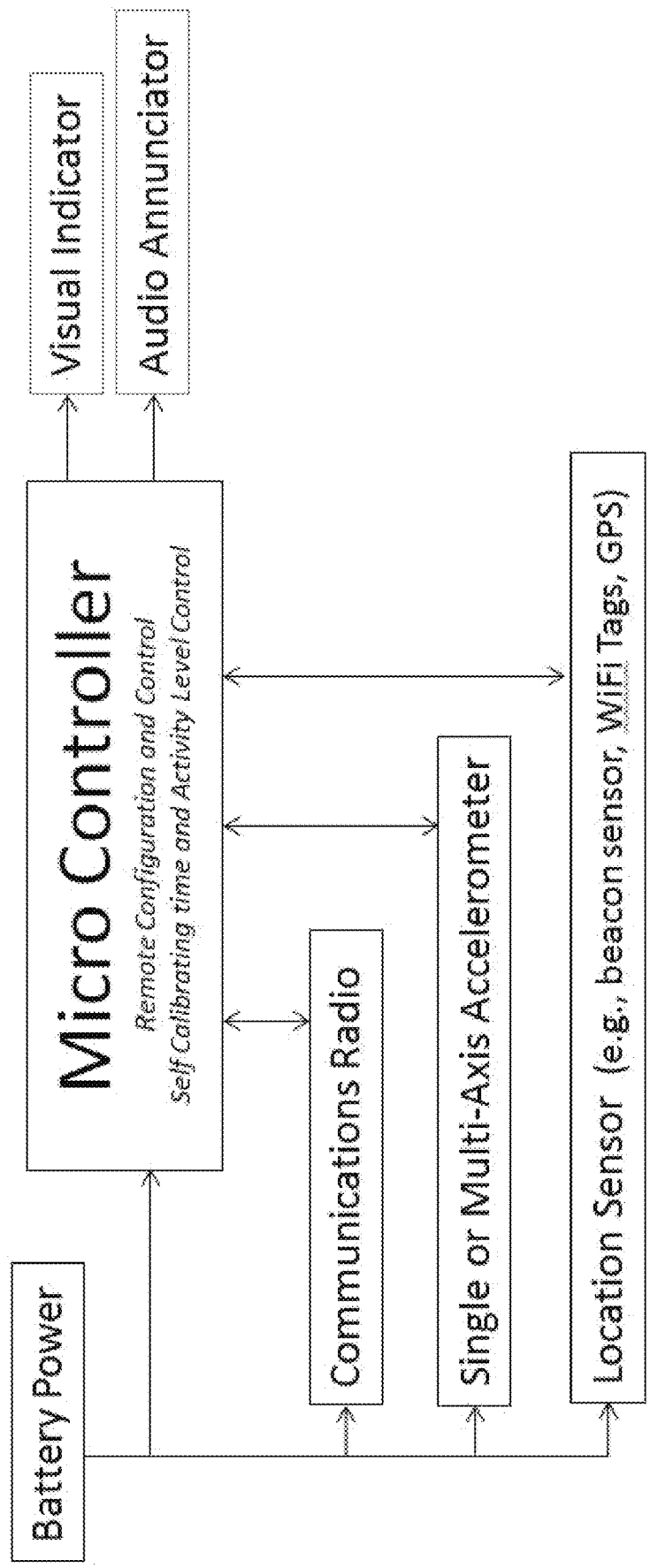
Figure 2: MAS Functional Block Diagram

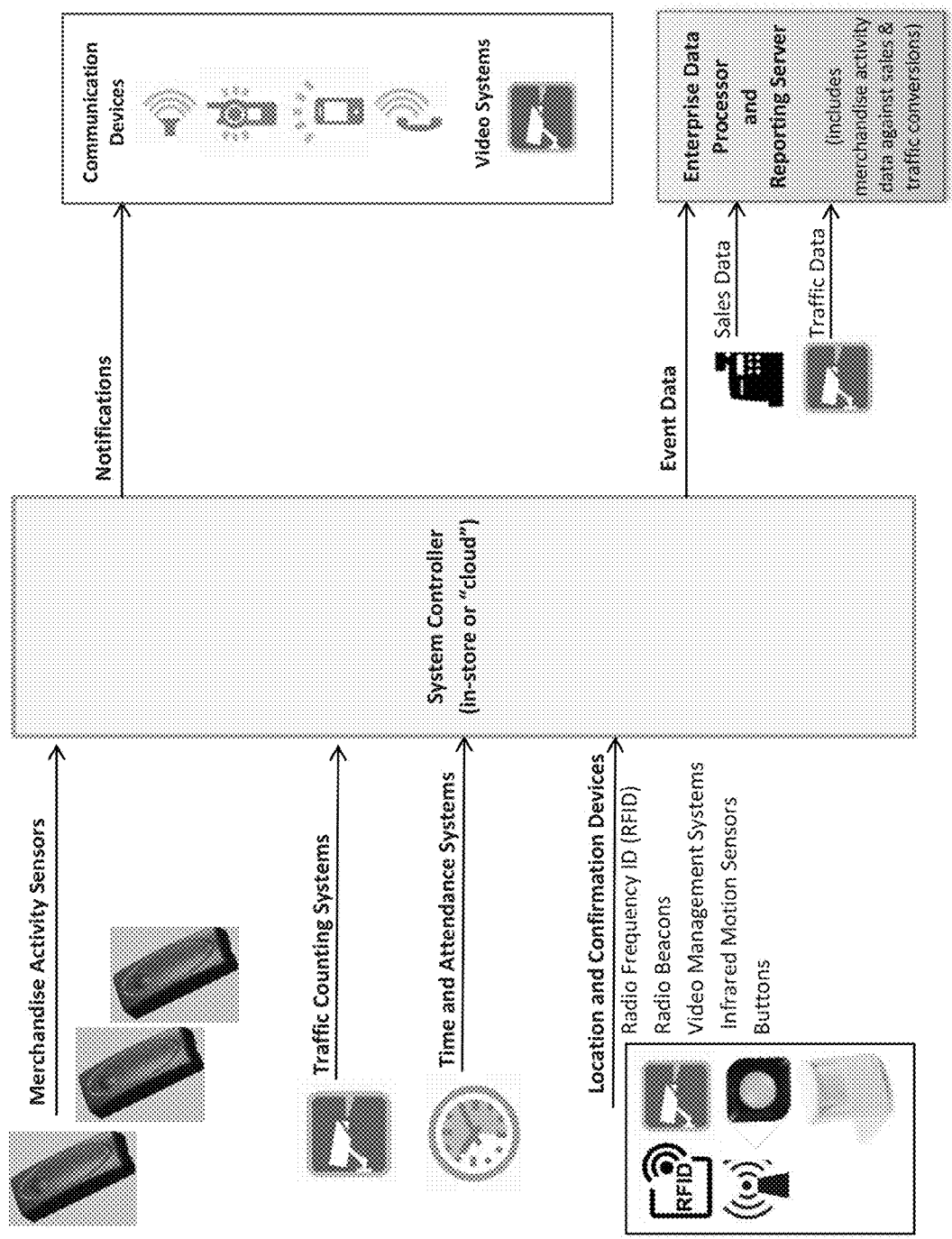
Figure 3: MAS System Level Integrations

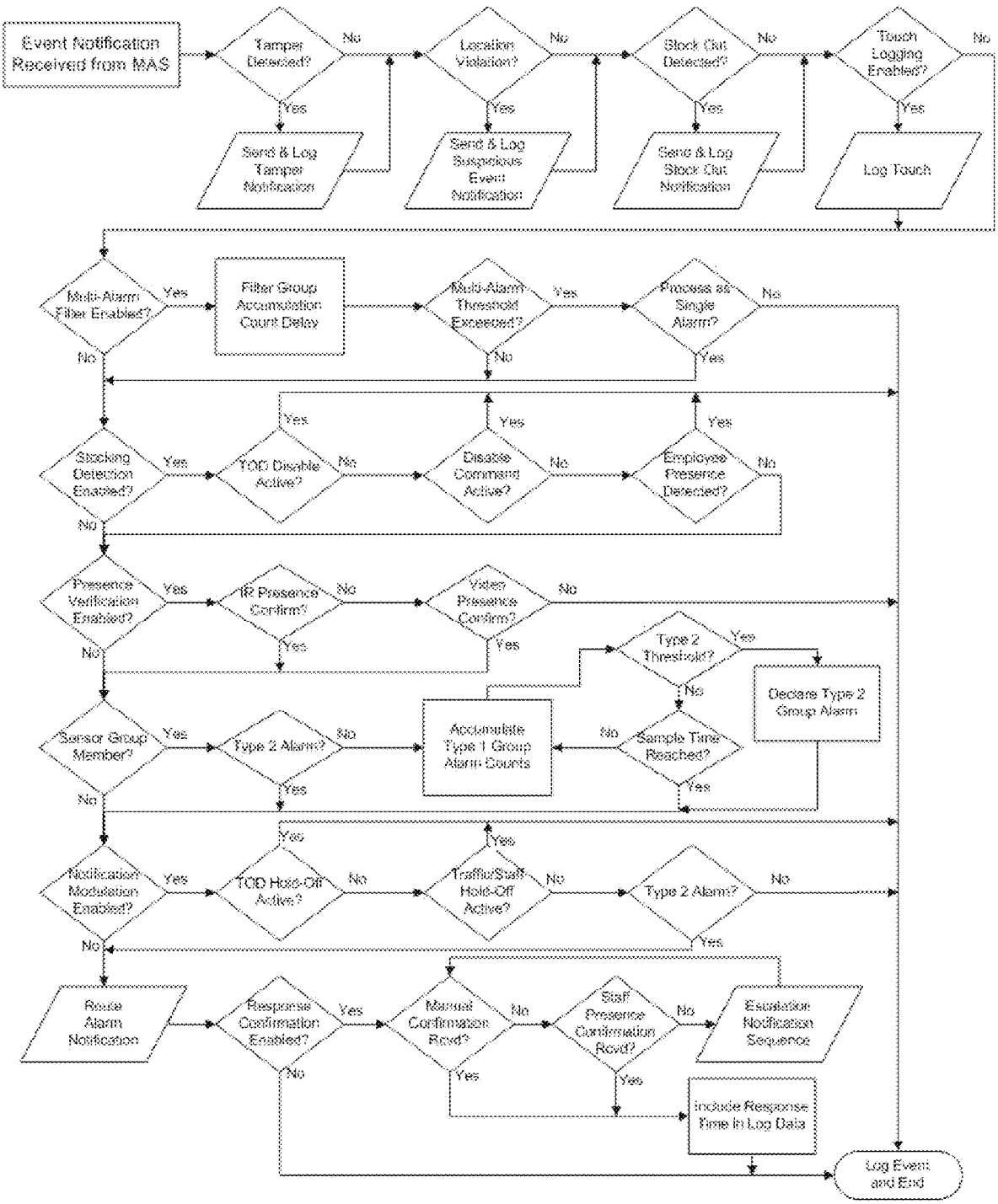
Figure 4: MAS System Level Alarm Processing

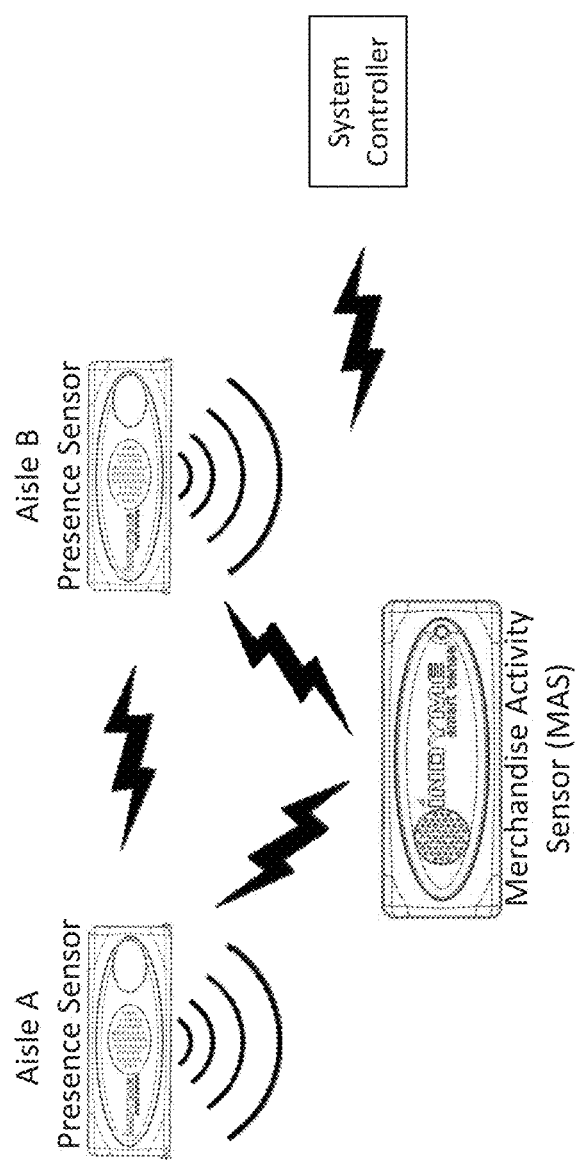
Figure 5A – Using People Presence Sensors to Filter MAS Activity Location

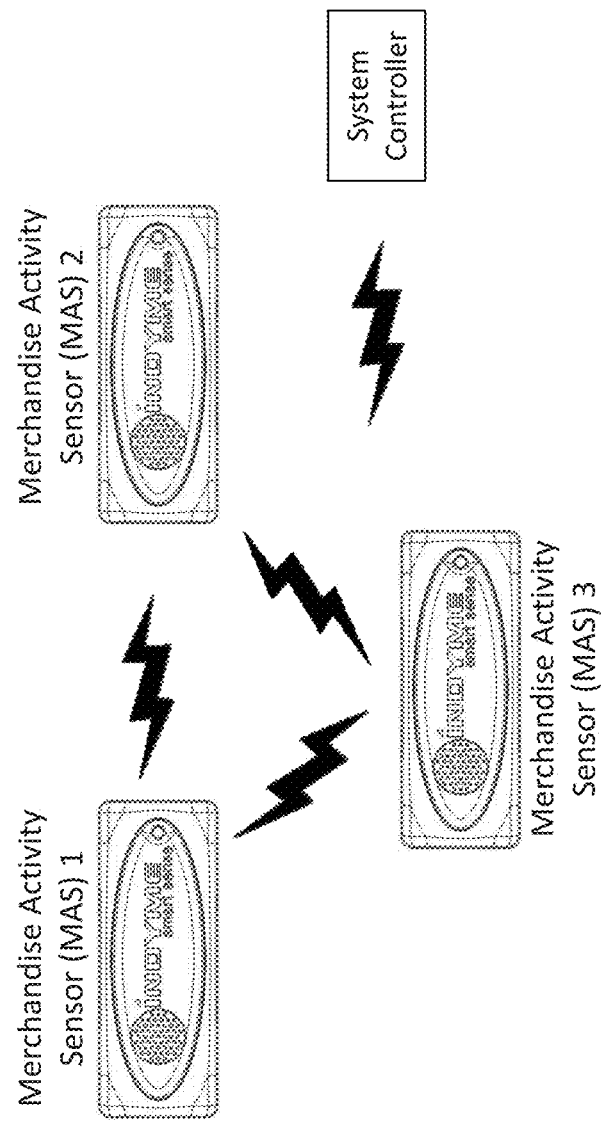
Figure 5B – Filtering and Alarm Summing by Multiple MAS

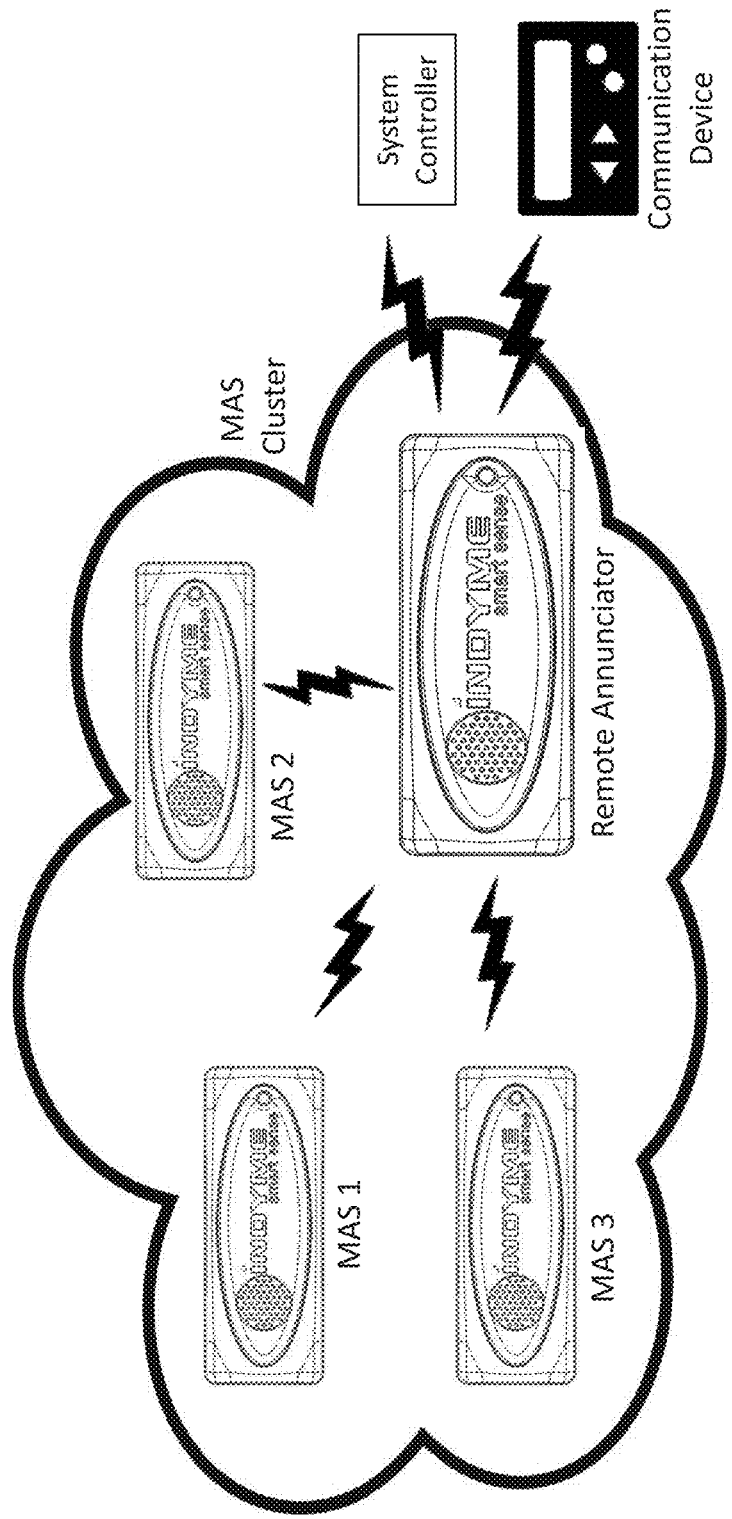
Figure 5C – MAS Cluster Processing via Remote Annunciator

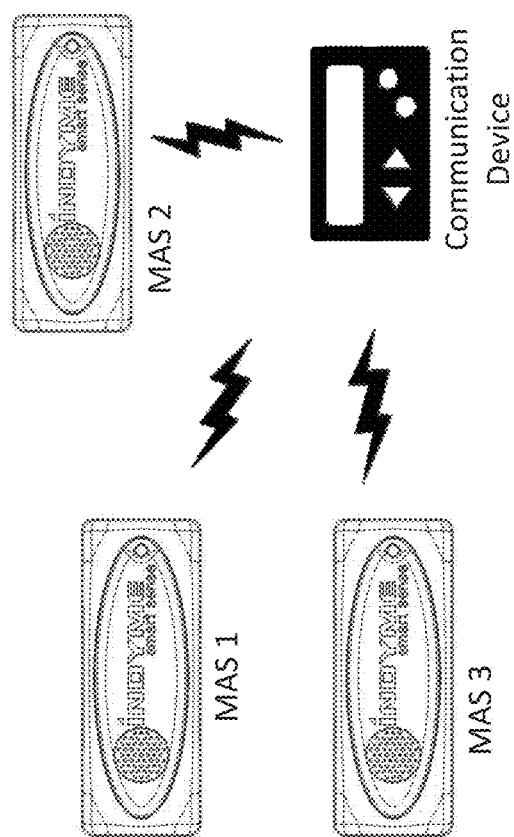
Figure 5D – MAS Notifications via Peer Communication Device

MERCHANDISE ACTIVITY SENSOR SYSTEM AND METHODS OF USING SAME

RELATED APPLICATIONS

This application is a continuation-in-part claiming the benefit of priority from U.S. patent application Ser. No. 15/269,774 filed Sep. 19, 2016, now U.S. Pat. No. 10,037,662, the application being a continuation-in-part which claims the benefit of priority from International Patent Application No. PCT/US15/51098 filed Sep. 18, 2015, which claims the benefit of priority from U.S. patent application Ser. No. 14/629,233 filed on Feb. 23, 2015, which claims the benefit of priority from U.S. Provisional Patent Application No. 62/052,026 filed on Sep. 18, 2014, the disclosure of which is hereby incorporated by reference in its entirety.

FIELD OF THE INVENTION

The present invention pertains generally to merchandise activity sensors. More particularly, the present invention pertains to sensors and systems using same for increasing the awareness of interactivity with merchandise on retail store displays (shelves, peg hooks, merchandise pushers, and other Point of Purchase displays) in order to facilitate more effective customer service, reduce theft and to provide additional analysis data related to merchandise/shopper interaction.

The present invention further pertains to an event and recognition correlation system. More particularly, the present invention is a system for identifying persons of interest in a retail store environment by identifying persons deemed relatively likely to engage in such theft based on repetitive proximity to events of interest and/or actual prior behaviors in order to promote proactive deterrence of merchandise theft.

The present invention further pertains to the conversion of cameras from passive to active deterrence devices aware of events occurring the environment. More particularly, the present invention pertains to awareness of behaviors often related to potential theft activity, such as the removal of large quantities of items from a shelf in a short period of time, typical of a thief "sweeping" a shelf of all products in a hurry. Upon detecting such activity, the device (herein "SmartDome") actively makes its presence known, inherently making SmartDome more threatening to a thief, since it is "aware" of suspicious behaviors, and because Smart-Dome brings this activity to the attention of store personnel via automated notification. While this enhanced device looks similar to conventional ceiling-mounted cameras, it differs in its ability to "go active" based on detected suspicious behaviors and thereby inherently deters theft and/or causes store personnel or other actions to accomplish this goal.

The present invention further pertains to monitoring environmental factors in a retail setting in order for a device to make intelligent decisions regarding when to provide notifications, rather than a simple reflex action of event in and notification out.

BACKGROUND OF THE INVENTION

Retailers suffer enormous losses due to theft of merchandise from the sales floor—recent studies peg this loss at $15.7 billion in 2013-2014 in the United States alone (www.GlobalRetailTheftBarometer.com). While some of this is due to individual shoplifters, an increasing proportion of the loss is through Organized Retail Crime (hereinafter "ORC") shoplifting rings that typically use "booster teams" to sweep large quantities of select merchandise from store shelves. Shoplifters and boosters alike try very hard to escape the notice of store teams by distracting the store team or otherwise lifting merchandise in store areas not likely to be immediately noticed. Simply knowing that merchandise movement is occurring in areas susceptible to theft activity can provide the store team with increased awareness so actions can be taken to reduce these sources of shrink. Detection and prompt notification of activity typical of a sweep (rapid removal of multiple items) heightens urgency and enables store team members to take actions that can safely circumvent costly in-process sweeps.

In order to reduce and even prevent ORC, retailers employ various strategies to monitor merchandise shopper interactions. The following examples represent some of the known strategies and why there remains a need for improved merchandise activity sensing.

RFID Item-Level Tags: Placing an RFID tag on every item of interest in a store and placing an RFID reader within range of all merchandise displays can provide an excellent and superior method of detecting suspicious events (e.g., theft), stock position, and other valuable information. However, this is prohibitively expensive—while item level tags might be justifiable on higher cost items likely to be stolen, it remains prohibitively costly to purchase and install RFID readers capable of covering an entire store. The present invention, while providing a less elegant approach, is far less costly and still provides an awareness that helps store staff.

"NeWave Smart Shelf" by NeWave Sensor Solutions uses RFID technology but instead of placing the RFID tags on the products, the tags are mounted on the shelves such that the placement of merchandise on the tag blocks the reading of that tag. As product is removed, the tag is sensed. These are sometimes used with product pushers or other merchandising systems. Though this approach can be much more accurate in detecting an actual removal/replacement of product than the invention and can also detect shelf-stock-outs, the cost to cover a shelf is enormous in terms of the equipment required, installation of tags and readers (AC power is required), and the very significant cost of ongoing reconfiguration as merchandise planograms change.

Shopperception uses a 3D detection device mounted above a merchandise interaction fixture to detect reaches into the fixture and removal/replacement of merchandise located at specific vertical plane X/Y coordinates. This is an excellent method for detecting these interactions and can be much more accurate than the invention, however, it also involves very expensive equipment that is costly to install and not practical for use at a significant number of merchandise fixtures throughout all stores in a chain. For those applications requiring less precision, the invention is economically a preferred approach.

Adhesive Tethers are typically used with expensive display merchandise (such as cameras and cell phones) to permit shoppers to hold the item within the range of a retractable tether. Removing the tether triggers an alarm. This approach will detect actual removal more accurately than the invention but is not practical for use when the actual item will be purchased by the shopper.

Patent Application WO 2014047272 (Invue Security Products) and WO 2014031651 (Southern Imperial) each disclose a device which detects motion of the product to which it is attached. Typically, this is in a "spider wrap" form factor in which a housing containing the sensor is firmly attached to relatively large high-cost merchandise; when moved from a shelf, the device can emit audio. The device also includes a light sensor such that when motion is detected and no light is sensed, it is assumed the merchandise is in a bag or otherwise obscured and possibly in the possession of a thief, which may then result in triggering an integral audio alarm. Unlike the present invention, this device must be affixed to individual merchandise items and is not suitable for smaller items.

Smart Pushers use a variety of methods to detect removal of merchandise from a pusher merchandising system; many of these also sense the amount of merchandise remaining in the pusher (including detection of stock-out conditions). While all of these will more reliably sense actual product removal than the invention, they require the considerable cost of instrumenting each pusher with sensing devices supported by electronics. By comparison, the invention can detect each merchandise dispense from any and all pushers on an entire shelving unit (i.e., multiple shelves on a rack) with a single wireless device, providing a much lower cost path to much of these benefits.

"Shelf Sensing Film" by Djb Group LLC (U.S. Pat. No. 8,695,878) is a sensing film placed on the shelf which detects the presence of merchandise placed upon the film. This can very accurately detect merchandise removal and replacement and even stock status, however, it is very expensive to install and requires considerable ongoing administration as planograms change. For purposes of basic activity detection, the invention provides a far lower cost approach and requires no special consideration in the planogram process.

In some cases, video systems with real-time analytics can detect suspicious merchandise interactions. However, reasonably thorough coverage requires a large number of cameras installed at very high expense—even then, it would be difficult for cameras to independently detect many suspicious events. As will be discussed, integration of the present invention with cameras can greatly increase the effectiveness of either solution independently.

Electronic Article Surveillance (EAS) systems trigger a local alarm at the exit door of a store when an EAS tag that has not been disarmed by a cashier prior to passing through the door. Though ubiquitous, these systems have little effect in deterring boosters (or even seasoned shoplifters) as the EAS alarm simply indicates that merchandise has just left the store and most retailers do not pursue suspects outside of the store. By comparison, a primary use of the present invention raises staff awareness at the location in the store where the merchandise is displayed, which can provide store staff with the opportunity to actually deter the theft or provide needed customer assistance. Likewise, a second use of the invention (in which a location sensing method is incorporated and the device is attached directly to high-value merchandise) provides a means of notification when an item is approaching the exit area but is still well away from the exit itself, which permits raising awareness, triggering of video capture, and other actions prior to exit.

Merchandise Dispensing Devices are typically anti-sweep mechanisms for razor blades, baby formula, and certain other high cost items that help avoid sweeps by only permitting one item to be taken at a time. These dispensing units can be quite costly and multiple items can still be removed from most of these dispensers, if only one at a time. This provides yet another application for the present invention, which can detect the unique vibration signature created with each dispense by most of these devices (as well as detect malicious efforts to gain entry into them) and drive awareness to the store team of these events.

Keeper Boxes are rugged locked plastic boxes (with integral EAS tags) which deter theft by increasing the sheer size of small valuable items, making them harder to conceal and more difficult to remove the EAS tag. However, these units take up much more shelf space, reducing the number of facings and depth of stock available for sale on the floor. Even when Keeper Boxes are used, the invention helps increase staff awareness of merchandise interactivity by detecting the removal/replacement of these boxes on store displays.

Japanese patent application 1998-140263 submitted by Tsutomu Tachibana describes triggering a musical sound on a nearby speaker (triggered by a radio transmission) when vibration on a merchandise display occurs. This would increase awareness of potential theft activity but the lack of intelligent event filtering would result in numerous notifications without regard for the likely urgency of the event or the ability of the store staff to respond, eventually reducing these notifications to background "white noise" that is increasingly ignored by store staff, negating the entire value of the device. The inability of the device to route specific location messages to various wireless communication devices typically used by store staff also seriously limits broad implementation of such a solution set. While the Tachibana approach and the present invention both use an accelerometer for sensing, the processing of that activity resulting in appropriate categorized alarm levels being delivered to appropriate store staff members provides improvements supporting ongoing effectiveness.

An additional problem area for retailers that the invention addresses is providing timely assistance to shoppers on the sales floor. Currently, it is often a somewhat random process for sales clerks to intersect with shoppers desiring assistance when and where needed. Shopper help buttons, as described in the Deal Clerk Paging System U.S. Pat. No. 4,741,020, and similar devices are used in some stores to enable shoppers to summon assistance. However, many stores find sales conversions and total sales tickets frequently increase if sales clerks approach shoppers when they are interacting with certain categories of merchandise—even when the shopper has not determined or indicated that assistance is desired. The invention provides a mechanism to empower sales teams to efficiently and proactively assist these shoppers through increased awareness of in-store activity.

The presence of cameras in the retail store environment has long been used to deter theft and promote apprehension of violators. Indeed, there exists such a proliferation that the ubiquitous presence of cameras has significantly reduced their deterrence value. Thieves, aware that it is impossible for all cameras to be monitored at all times and rightly suspecting that most cameras are fake (e.g., dummy domes), are increasingly emboldened to steal despite the presence of cameras.

This decline in the deterrence effectiveness of cameras creates a real need to materially change the way cameras are perceived by thieves. The Loss Prevention Research Council (LPRC), a nationally recognized University of Florida think tank focused on theft behaviors and effective deterrence notes, "to reduce theft you have to change the thief's behavior. This is accomplished by increasing the perceived risk a thief experiences versus the expected reward from selling the stolen goods. Ideally, this should occur at the shelf, at the moment the thief has to commit to steal. Perceived risk is created by anti-theft devices located at the point of theft, these devices have the potential to lead to an apprehension of the thief by store personnel." The mantra of the LPRC is SEE IT, GET IT, FEAR IT This means the thief should very quickly see the deterrent device, get it in the sense of knowing it is an anti-theft device, and fear it, meaning a heightened perception of the risk of apprehension.

Cameras, as deterrent devices, are inherently passive. They are typically attached to the ceiling and provide no indication of activity whatsoever; nor do they detect interactions with merchandise or sustained presence (dwell) of persons in a particular area. Thieves see them, they get them, but they increasingly do not fear them. This makes cameras increasingly ineffective as a deterrent tool.

Over time, anti-theft measures that have repetitive and predictable outcomes are perceived by thieves as ineffective and lose their deterrence value as thieves leverage their understanding to evade these measures and adapt their stealing craft.

This is certainly true for in-store alarms that react in the same way each time a specific event occurs. One well known example is Electronic Article Surveillance (EAS) which sounds an alarm at the store exit every time tagged unpurchased merchandise exits the store. This has become so repetitive that even store employees rarely pay attention to the alarm and thieves have learned to simply ignore the alarm and keep walking. Many retailers sadly admit that they purchase EAS not because it is all that effective but only because not having one makes them more vulnerable when all other nearby retailers have one.

In another example, if a device that detects removal of merchandise from a shelf always alarms each time five or more items are removed, the thief quickly learns to only remove four items at a time; or if every such alarm summons store personnel who arrive within a typical response time, this predictability also emboldens a thief to adapt.

In light of the above, it is an object of the present invention to provide the desired features described herein as well as additional advantages.

SUMMARY OF THE INVENTION

The present invention is a device for detecting the removal of merchandise from retail merchandise fixtures by sensing vibration patterns induced through the merchandising fixture structure. The act of removing merchandise from a display fixture induces vibration into the fixture. The Merchandise Activity Sensor (MAS), which is a battery powered wireless device, mounts to the store fixture and uses an integral single or multi-axis accelerometer to detect these vibrations. Various algorithms comprising combinations of vibration level, discernible vibration events, timing of events, quantity of events, and (in some cases) frequency content of the vibration signal are used to determine when the vibration pattern is an event of modest interest (such as typical shopping or possible shoplifting—a "Type 1 Alarm") or of high interest (such as a possible sweep incident—a "Type 2 Alarm"). Variables within these algorithms are adjusted for optimum results based on characteristics of the monitored merchandise and of the merchandise fixture type (e.g., gondola shelf, gondola pegboard hook, pusher, pallet racking, etc.).

In most cases, a Type 1 Alarm causes the device to output a local audio sound and/or to flash an integral light—these actions raise the awareness of any nearby person(s) and are known to deter theft activity. However, the service strategy of some stores is such that one or more members of the store team are notified via communication devices of most or all Type 1 events to enable them to efficiently provide a proactive service presence, which is known to increase sales. A Type 2 Alarm typically additionally results in a notification to one or more members of a store team and/or may cause a video system to automatically zero in on the area of interest for manual or automatic analysis of the event.

While this patent includes functionality on the MAS (that is, the sensor device), it must be remembered that many important functions—several of which drive certain claims—are based on system level functions including time of day and interaction with other store systems. An example already mentioned is the integration with a video system and possible collaboration to validate an alarm situation. Another example includes evaluation and intelligent alarm declarations when activity is detected by more than one MAS in the same area; yet another is when different MAS devices separately detect related events; and yet another is the modulation of alarm thresholds based on the level of traffic and/or staffing in the store.

In addition, the MAS can also be attached to actual merchandise (typically high value items), the movement of which can trigger Type 1 awareness notifications. By incorporating location awareness sensing within the MAS, awareness notifications can also include location information. For example, a MAS in range of location beacons placed at areas one would travel to exit the store could cause the MAS to trigger a Type 2 alarm that results in notifications to store personnel and video systems that include the current location of the merchandise.

MAS provides detection of merchandise interaction activity to alert store employees of possible shopper engagement opportunities that could result in building sales through up-sell/cross-sell efforts.

MAS also provides detection of suspicious merchandise interaction activity to increase store staff awareness that can help reduce actual theft from the store (shrink).

MAS further provides collection of merchandise interaction activity data for use in merchandising study analytics used typically for evaluating effectiveness of new displays, positioning, packaging, merchandise selections, and other purposes.

The present invention can also associate the identification of one or more persons in a retail environment with a detected suspicious incident (an Event of Interest (EOI)), such as rapid removal of a large quantity of merchandise from a shelf. The invention then recognizes trends correlating the repeated presence of identified person(s) with coincident EOIs across multiple visits at one or more store locations. A high correlation level results in the declaration of such an identified person as a Person of Interest (POI). Each POI is assigned a threat rating typically driven by degree of POI identification certainty and associated loss level (e.g., estimated theft per visit, frequency of visits, and total history of attributable incidents). Appropriate store team, loss prevention professionals, and/or remote video monitoring personnel may then be notified in real time of the presence of such POIs (and their threat rating) as soon as practicable upon entry to a store and/or when an EOI is detected when one or more POI's are present. This empowers these resources to proactively take appropriate actions to deter or apprehend.

The invention may be implemented to seek identification markers for persons routinely (i.e., before an EOI occurs, then linking such identified persons to an EOI occurring coincident with the identified person(s) presence). Alternatively, it may seek identification markers of those present only when an EOI occurs. Either way, since the invention relies upon trends and not an isolated incident to assign POI status, linkage accuracy between a given EOI and persons in the vicinity of the EOI is not critical. For example, detected rapid removal of a large quantity of merchandise from a shelf (an EOI) is atypical shopping behavior, but typical of ORC boosters. Depending upon the person identification method(s) used, the system may link multiple nearby persons to the EOI—perhaps every identified person in the entire store. Some of these identified persons may be the actual perpetrators and some just uninvolved shoppers. In the case of repeat offenses by the same identified person(s), over time the invention will declare the actual perpetrators as POI's then increase their associated threat level as additional offenses are detected. Meanwhile, uninvolved shoppers identified in the vicinity of an EOI remain statistically irrelevant in this process.

The present invention can also transform real or imitation cameras from an increasingly ineffective, passive deterrence role to a much more effective active deterrence device, especially in areas not ideally suited for more traditional loss prevention devices. This is typically accomplished by using a readily mounted and identifiable form factor (e.g., a dome camera) and enhancing that device by proactively drawing the potential thief's attention to the camera based upon actions actually occurring in the store. Note that the term "camera" typically refers to a real or dummy dome camera, though other camera form factors could also be used. Two of the most common dome camera configurations are shown below (opaque or semi-opaque domes in which the camera is difficult or impossible to see and non-dome or clear dome Pan-Tilt-Zoom (PTZ) cameras, on which the camera lens can be readily seen).

A further objective of the invention is to avoid overloading a lean store team with action notifications any more than necessary. Experience has shown that overwhelmed teams simply start ignoring these notifications (as they already do with EAS, as noted previously) which defeats the value of timely store associate response to suspicious events.

One objective of the invention is to avoid overloading a lean store team with action notifications any more than necessary. Experience has shown that overwhelmed teams simply start ignoring these notifications (as they already do with EAS, as noted previously) which defeats the value of timely store associate response to suspicious events.

It is an object of the present invention to increase awareness of the location of shoppers that may desire assistance, which promotes efficient shopper engagement by store employees, often leading to increased sales.

It is another object of the present invention to increase awareness of potential theft activity at the point of theft, a location typically well inside the store, which enables staff to respond and, by mere presence, deter theft activity.

It is yet another object of the present invention to provide real time awareness of an actual theft in progress that can enable loss prevention professionals to apprehend a suspect and/or to increase the probability of conviction through the use of video push (to mobile devices and monitoring stations) and video capture triggered by MAS detected merchandise activity.

It is still another object of the present invention to provide a unique sensing method through the use of an accelerometer to detect vibrations induced into a retail store display fixture due to merchandise movement/removal/replacement. Additionally, when attached directly to a high value merchandise item, the MAS detects when the item is in motion and uses location sensing to determine if the item is entering an area in which alarm notifications should be sent, i.e. approaching a store exit.

It is another object of the present invention to be adaptable and wireless. Algorithms enable MAS to detect activity on various types of merchandising fixtures, rather than being dedicated to a single specific type. For example, merchandising pushers exhibit a very distinctive vibration signature when an item is removed from any pusher on any shelf of a store fixture (gondola). Being wireless simplifies installation since MAS can be readily installed without the need for signal or power wires. This also enables the sensor to easily adapt to new store layouts during remodels and periodic fixture or merchandise resets.

It is an object of the present invention to provide detection of activities or groups of activities sometimes known to be associated with one or more types of theft activity and identify such activities as potential EOI.

It is another object of the present invention to provide methods of detection of direct or indirect markers establishing a trackable identification of a person.

It is still another object of the present invention to provide a process for identifying and evaluating the correlation of EOI trends with an identified person that results in labelling such person as a POI. Additionally, it is an object of the present invention to provide processing of known and/or historical theft activity of the POI and assign a code rating to that POI for future monitoring.

It is yet another object of the present invention to provide triggering of real time notifications thereby providing immediate awareness to a store team and/or loss prevention professional to more effectively deter theft and apprehend suspects.

It is still another object of the present invention to retain and process data to provide a chain of evidence reasonably linking an apprehended POI to prior theft activity in order to support prosecutorial success.

It is another object of the present invention to provide a theft deterrent device that can integrate with MAS, consists of several key features including a housing, sensing technology, local audio capabilities, and visual cues.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 illustrates a basic functional overview of the MAS.

FIG. 2 illustrates a block diagram of MAS device functional components.

FIG. 3 illustrates system level integrations used to process MAS alarms.

FIG. 4 provides a flow chart of MAS sensor operation.

FIG. 5A provides a first topology embodiment of MAS: People presence sensors to filter MAS activity notifications; FIG. 5B provides a second topology embodiment of MAS: Filtering and Alarm Summing by multiple MAS; FIG. 5C provides a third topology embodiment of MAS: MAS cluster processing via remote annunciator; and FIG. 5D provides a fourth topology embodiment of MAS: MAS notifications via peer communication device.

DETAILED DESCRIPTION OF THE INVENTION

Definitions

Figure 6:
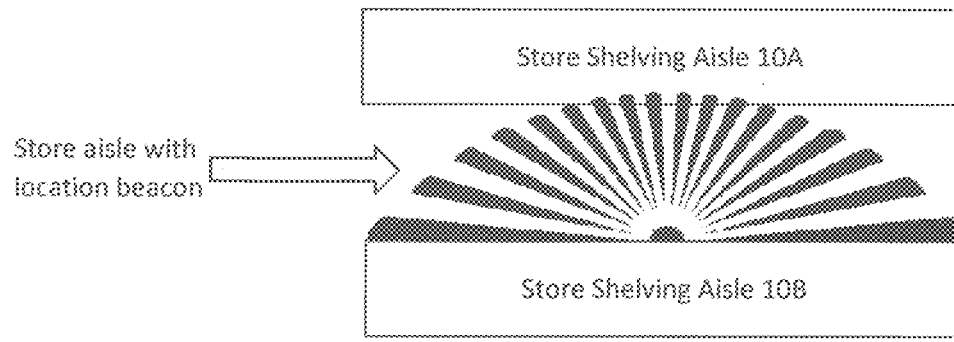
FIG. 6 illustrates the Location Based Services function of MAS.

"Merchandise Activity Sensor (MAS)" as used in the present invention is a hardware module containing a single or multi-axis accelerometer, micro-controller, radio transceiver and/or an audio annunciator and LED, and firmware enabling it to perform the function described. "Touch" as used in the present invention is the detection of merchandise being removed or placed; MAS typically does not alarm in response to individual touches but retains activity data for reporting purposes.

"Fixture" as used in the present invention is any secondary surface used for holding an object. Examples of fixtures include, but are not limited to, shelves, displays, gondolas, merchandise pushers, peg hooks, pallets, cardboard displays, clothing hangers, merchandise dispensers and the like.

"Vibration" as used in the present invention is any change in the equilibrium state of an object upon which a means of detection as described herein is associated, the change being along the x-, y- or z-axis.

"Direct force" as used in the present invention is a force that results in movement of an object from a state of equilibrium when the force is applied to the object.

"Indirect force" as used in this present invention is a force that results in movement of an object from a state of equilibrium when the force is applied to a secondary object or surface.

"Type 1 Alarm" as used in the present invention is an alarm triggered due to detection of vibration consistent with multiple touches typical of shopping or shoplifting.

"Type 2 Alarm" as used in the present invention is an alarm triggered due to detection of rapid removal of multiple merchandise items, which may indicate a sweep in progress.

"Notification" as used in the present invention is a message to staff via any communication device or channel including but not limited to overhead PA speakers, 2-way radio, wired or wireless telephone, smart wireless device, or pager. Notification can also include display of status on a touchscreen, computer screen, or mobility device. It can also mean sending information to another store system, such as a video management system.

"Confirmation action" as used in the present invention is an act of a staff member interacting with the system in response to a notification which results in a closed loop confirmation.

"Boosters" as used in the present invention are theft teams (most commonly working on behalf of an Organized Retail Crime ring) that typically steal large quantities of targeted merchandise from store shelves.

"Sweep" as used in the present invention is the act of removing a large quantity of the same merchandise item with the intent of theft. Sweeping is routinely practiced by Boosters.

"Gondola" as used in the present invention is the metal modular shelving units typical of supermarket aisles and many other types of stores.

"Merchandise pushers" as used in the present invention are commonly used on gondola shelves and in some types of secure merchandise dispensers for holding a row ("facing") of merchandise between two rails and using a spring-loaded pushing device to keep the merchandise firmly against a stop on the front of the shelf. When a merchandise item is removed, the pusher "pops" the row of merchandise forward to fill the empty space.

"Location Based Services (LBS)" as used in the present invention is a system comprising an array of sensors and beacons located in store shells for use in identifying a shopper's approximate location in the store. In conjunction with MAS, LBS can provide data on shopper interaction with specific merchandise and send relevant information to customers.

"Event of Interest (EOI)" as used in the present invention is a detected activity and/or group of activities sometimes known to be associated with one or more types of theft activity.

"Person of Interest (POI)" as used in the present invention is a person identified as being associated with historical theft activity based on a correlation of EOI trends with the presence of said individual in the vicinity of EOI.

"Threat Characterization Code (TCC)" as used in the present invention is the processing of known and/or estimated historical theft activity and associated modus operandi of the POI that assigns a code rating to that POI.

A functional overview of the MAS is provided in FIG. 1. When a single package is removed from a retail merchandise fixture, the MAS registers this as a touch. If one or more touches are detected meeting definable criteria, the LED flashes once and the annunciator beeps (or an audio message plays) indicating a typical shopping event occurred. In the alternative, when multiple packages are removed from a retail merchandise fixture within a short period of time meeting definable criteria, the MAS LED alarm flashes, the annunciator alarm/voice sounds, and a remote notification occurs indicating a potential sweep or at least multiple item movement requiring investigation. A radio transceiver sends the alarm to the system controller which in turn sends a notification alarm to a communication device (such as 2-way radios, pagers, wireless phones, smart mobile devices, PA loudspeakers, etc.).

Operating Sequence:

The following description is a typical operating sequence of MAS provided as an example of the functionality of the invention and is in no way meant to limit the scope of the invention and/or its capabilities. The operating variables permit the elimination and modification of operating steps based on user preference and potential situations.

In the static state, the microprocessor unit is in a low power sleep mode. The detection of vibrations by the integral accelerometer that exceed a set variable threshold "wakes up" the microprocessor unit.

The microprocessor uses assigned, pre-programed (or learned) algorithms to evaluate vibration amplitude levels across time to determine if merchandise movement meeting criteria for declaring a Type 1 alarm have occurred. If yes (conditions meet the criteria for a Type 1 alarm), the local audio annunciator and/or visual indicator (typically a LED) are momentarily activated to alert the shopper/thief that activity has been detected. The annunciator and indicator are typically integral to the MAS device. However, since MAS must be mounted for optimum vibration sensing, a separate nearby module (the "Remote Annunciator") positioned for optimum visibility and controlled by MAS via wire or wireless signal may provide auxiliary annunciation/indication. If conditions do not meet the criteria for a Type 1 alarm or if no further vibration is detected after a Type 1 alarm, the microprocessor recalibrates for the next event and returns to the low power sleep mode. Optionally, MAS can be configured to transmit a Type 1 alarm to the system controller, such as may be desired for high service touch environments or to gather data related to routine shopping activity. As a further option, data can also be retained at the device level and accumulated for periodic transmission to the infrastructure level as a means for reducing the quantity of transmissions and extending battery life.

After an alarm event and/or periodically, the MAS internally recalibrates the accelerometer, for example, a precisely mounted 3-axis accelerometer typically senses 0 g's in two axis and 1 g in the vertical axis but off-axis installation are compensated through the calibration process. The recalibration also resets the threshold to normalize out any ambient vibration not considered by the algorithms for alarm determination.

The microprocessor continues to evaluate the vibration to determine if, based on the assigned algorithm, conditions meeting criteria for declaring a Type 2 alarm occur. If yes, the conditions meet the criteria for a Type 2 alarm, the radio transmits this event trigger to the System Controller, which follows business rules that typically result in one or more notifications to employees or other systems. Optionally, the annunciator and/or LED on the MAS device or the Remote Annunciator may activate for a lengthier period of time or with escalated volume and content (such as a voice message) relative to a Type 1 event. Though this example illustrates a Type 1 followed by Type 2 alarm, it is not necessary to transition through a Type 1 prior to declaring a Type 2 alarm. For example, vibration activity of a rapid repeated or extended nature exceeding defined time duration and/or amplitude thresholds may constitute an immediate Type 2 alarm.

Alarm Algorithms:

Various algorithms determine alarm conditions. Vibration amplitude, duration of vibration, and repeated incidents of vibration activities are most commonly evaluated for alarm determination. However, frequency domain information using Fast Fourier Transform (FFT) or other analysis may also be used to identify specific vibration signatures relevant to certain types of events. The following provide high level descriptions for anticipated algorithms and outcomes applicable to MAS:

Gondola Shelving: Tests confirm that all shelving on a gondola unit can be monitored by a single MAS. Vibration induced into the shelving transmits through the uprights and into the backboard, where the MAS typically mounts. The algorithm sensitivity level is dependent upon the type of merchandise on the shelves (e.g., heavy or light). It should be noted that while a single MAS can be used to detect activity anywhere on a gondola, it is sometimes advantageous to mount a MAS on each shelving unit so as to more precisely identify the merchandise being moved.

Pallet Rack Shelving: Pallet rack shelving is typical of large DIY warehouse stores. Like gondolas, a MAS can typically detect merchandise movement on multiple shelves of pallet rack shelving. However, due to the heavy construction of these fixtures, for best detection on some types of merchandise, the MAS would mount directly to the bottom of a shelf. Also like gondolas, algorithm sensitivity is dependent on merchandise type.

Peg Hooks: Tests have shown excellent detection of merchandise removal from gondola peg hooks mounted anywhere on a monitored pegboard. This removal generates a very characteristic vibration signature that is readily detected. Multiple incidences of this signature across a limited time frame is used to distinguish between typical shopping behavior (Type 1 Alarms) and possible sweep activity (Type 2 alarms). Monitoring can also be effective on peg hooks and hangers mounted to slat panels, wire racks, and other fixtures that support hanging merchandise.

Locked Peg Hooks: Peg hooks with integral locking mechanisms, which require assistance from sales staff to access the desired merchandise, are commonly used to reduce theft of high-value items. Thieves sometimes circumvent this by cutting the merchandise packaging to remove the item. MAS can detect this cutting activity due to the vibration induced into the fixture.

Cardboard Fixtures: Many stores use temporary fixtures constructed of cardboard or corrugated plastic. Testing confirms that algorithms similar to those effective on gondola shelving will also perform well on these temporary fixtures.

Clothing Hangers: Testing has not been performed to characterize clothes hanger fixtures typical of apparel stores. However, it is predicted that the movement of a hangar will create a readily identifiable vibration signature.

Merchandise Pushers: When an item is removed from a pusher and the remaining merchandise snaps forward, a very characteristic vibration signature is generated—this is readily detected by MAS from any pusher on an entire gondola unit. This means MAS can readily determine a fairly accurate count of dispenses, which is then used to define Type 1 and 2 alarms. Also, a large vibration amplitude typically indicates removal of multiple items from a single facing, which can also be used to declare a Type 2 alarm. There are two unique advantages when using MAS with pushers versus most other merchandising systems: Dispenses can be distinguished from placing the merchandise back into the pusher, making the dispense detection alarms much more definitive; and dispenses of the last item in a pusher facing (constituting stock-out of that facing) creates a vibration signature uniquely identifiable relative to other dispenses. This enables MAS to detect this stock-out and send a unique alarm message to that effect. In some cases, metal "taps" or other devices may be attached to the pusher to make this stock-out dispense even more identifiable due to high vibration amplitude, distinctive duration and/or frequency, or multiple sharp vibration spikes ("ringing").

Merchandise Dispensers (with clickers): A number of anti-sweep merchandise dispensers require shoppers to turn a knob or take a similar action to dispense each product item. These knobs often incorporate a "clicker" that creates a clicking sound intended to raise store employee awareness of the event (i.e., an extended clicking session might indicate a sweep in progress). The MAS can detect these clicks when the dispensers and MAS are mounted on the same gondola assembly. Each click emits a readily identifiable vibration signature and the MAS can be calibrated with the quantity of clicks equating to a single dispense. From this, Type 1 and 2 Alarm events can be declared. In some types of dispensers a facing stock-out event can be detected using methods similar to merchandise pushers (a form of which are often incorporated in these dispensers).

Ambient Vibration Auto-Adjust: Some store environments, such as sales floors in multiple-story buildings, may have ambient vibration levels induced into the fixtures due to HVAC equipment or other sources. The MAS can be configured to automatically adjust its base detection threshold to normalize out this ambient vibration while still enabling the unit to detect events of interest.

Alarm Learn Mode: While algorithms are typically defined based on the factors previously outlined, an alternative method is to place the MAS into "Learn Mode" then perform events that minimally define a Level 1 and a Level 2 Alarm. MAS will then auto-set these variables (such as sensitivity threshold and quantity of events within an elapsed time period) to detect similar events in the future. The preferred method of invoking learn mode and entering relevant information can be performed using a smart mobile device (linked to the system Controller or directly to the MAS using various wireless technologies), a computer linked to the System controller locally or remotely, an infrared controller (similar to a television remote control) communicating directly to the MAS device through an infrared portal, or even using switches integral to the MAS device.

Tamper Alarm: Once the MAS is mounted and calibrated, its multi-axis accelerometer senses orientation (i.e., which way is down). An unexpected dismounting of the device can be quickly detected by the device and designated a Tamper Event, which would typically create a very aggressive local annunciation and the transmission of a Tamper Alarm to the System controller, which can then output the appropriate notifications.

Optional Functionality:

The following related functions are typically implemented at the system and ecosystem levels (rather at the MAS end device level, though some of these can be implemented through MAS-level peer interactivity) and may be offered on an optional basis:

Traffic Alarm Modulation: Integration of the System Controller with the store's traffic counting system (which counts people going in and out of the store and often calculating how many are in the store at any given time) enables the System Controller to make intelligent decisions regarding sending Notifications relative to merchandise activity alarms. For example, during a peak shopping time when many shoppers are in the store, much more merchandise activity is to be expected and, most likely, the store is staffed more heavily than usual. In this situation, merchandise activity resulting in a Type 2 Alarm in some areas of the store (such as merchandise least likely to benefit from personal assistance and/or be victimized by a sweep) may not result in Notifications to store personnel. At the other extreme, during very light traffic periods when store staffing may be lean, it may even be desirable to provide Type 1 Alarm notifications in select high margin/high service merchandise areas to promote shopper engagement by store staff.

Time Clock Alarm Modulation: Integration with the store's time clock system enables the System Controller to monitor the number of staff clocked in as "on duty" and can be used to intelligently filter the Type 1 and Type 2 alarms that actually result in notification to store personnel. Combining Time Clock and Traffic Data provides a further level of alarm modulation by considering both conditions prior to issuing alarm notifications.

Proximity Multi-Alarm Consolidation Filtering: Some vibration incidents may be detected by more than one MAS. For example, a long multi-section gondola shelf may be outfitted with several MAS—perhaps one for each gondola segment. Movement of heavy merchandise could trigger simultaneous alarms in more than one MAS. When this occurs among multiple MAS mounted on the same structure or otherwise in close proximity, the System Controller or a MAS devices peer-to-peer collaboration scheme can be configured to consolidate these alarm events into a single notification.

Alarm Summing by Multiple MAS Devices: MAS devices mounted on different store fixtures in the same vicinity each detecting touches at or below Type 1 alarm levels might collectively be identified as constituting a Type 2 alarm since this activity may indicate a sly sweeper removing merchandise from different fixtures to avoid detection.

Broad Multi-Alarm Auto-Disable: Certain events, such as an earthquake, a subway passing nearby, or a heavy forklift on a flexible floor, can trigger alarms on many or even all MAS in a store. The System Controller or a MAS devices peer-to-peer collaboration scheme can be configured to identify this as a special event that results in a special consolidated notification or no notifications.

Video System Integration Functions: Integrating with a store Video Management System (VMS) enables the MAS System Controller to notify the VMS of alarm incidences. This can result in the following response behaviors: A camera can automatically direct its focus to the location at which the alarm is occurring, permitting fewer cameras in the store to more efficiently monitor events of interest; The video related to the event can be viewed in real time by a remote person or pushed directly to a mobile device carried by personnel in the store, who can then assess the situation and determine what actions, if any, should be taken; or a smart VMS now directed by MAS to the event of interest may use analytics to detect sweep events and certain other events of interest, which can then result in an escalated notification or other actions.

Stocking Disable: A potential disadvantage of the MAS method of sensing merchandise movement is the difficulty of differentiating legitimate stocking activity from sweep activity (though this is less of a challenge with merchandise pushers, as noted previously). Methods to address this issue include:

Store Hours Alarm Filter: During closed hours when a great deal of stocking occurs, the MAS devices and/or the System Controller notifications are automatically disabled;

Manual Disable Command: Using a mobile communication device, a computer, or other device communicating with the system Controller and/or a MAS device, an authorized store team member can temporarily disable alarm Notifications originating from one or more MAS devices or the entire system. This can involve manual entry of information or using the mobile communication device to capture information from a bar code, QR code, NFC tag, or beacon; and

- Auto-Recognition of Employees: The presence of one or more store employees in the immediate vicinity of an alarming MAS can automatically disable notifications. Auto-recognition methods include: VMS recognition of the vest or hat color/pattern of team member uniforms; and Beacon or other micro-location methods detecting a device carried (e.g., smart mobility device) or worn (e.g., RFID or beacon/WiFi tag) by employees
- Location Awareness: Optional location sensing (such as beacons or "WiFi Tag" methods) enables the MAS to be aware of its location. This information can be used for determining the location of the MAS during initial set up, subsequent re-location, and alarms when in motion (i.e., when affixed to a merchandise item).
- Merchandise Interaction Detection: MAS activity data can also populate a database used to analyze shopper merchandise interactions. Depending on the intended use of the data, the detection algorithm may be adjusted to be more or less sensitive for defining an event of interest. For example, every merchandise touch interaction may be reported and, when correlated with Point of Sale (POS) data, can provide a view of sale conversion relative to merchandise interaction.
- Confirmation Action: The system can provide data measuring the response effectiveness of store personnel to MAS alarm Notifications. This requires a means of determining that an employee went to the location of the alarm within a reasonable amount of time after the Notification. The method may be as simple as pressing a button integral or ancillary to the MAS module or similar implementations of previously described Manual Disable Command or Auto-Recognition of Employees.
- Summon Assistance: The MAS could be attached to the inside of a door or window such that a person desiring access or assistance could knock and the MAS would trigger the system to summon someone. For example, 3 knocks on the door or window could be interpreted by the algorithm as a valid request. This application may be helpful in the following instances:
  - Closed Hours Associate Access: Store employees arriving for work when the store is closed often have difficulty getting the attention of someone in the store to let them in, which can be dangerous during dark winter early morning hours. Knocking on the glass triggers MAS and, if the system validates that the store is closed, the store staff is notified.
  - Receiving Door Access: Delivery drivers are often delayed at retail stores due to difficulty raising the attention of an employee to open the receiving door. Simply knocking on the door can trigger a notification summoning assistance from anywhere in the store.

System Level Alarm Processing:

To better understand system level operation of the invention, refer to FIG. 3 for a view of typical system level integrations and the following discussion explaining the FIG. 4 flow chart. It should be understood that the sequence of the various subroutines shown in this figure can be re-arranged as desired to optimally meet application requirements.

System level alarm processing commences with reception of an alarm (or event) notification from a MAS module. Module tamper alarms and location violations (a mobile module entering an alarm zone) immediately result in an urgent Notification. Stock out detections (such as removal of the last item on a pusher facing) trigger a Notification and are logged to a stocking tracking application for further processing. If the system is configured to track Touches, each received alarm is logged.

The "Multi-Alarm Filter" subroutine counts each simultaneous alarm occurrence from multiple MAS devices in a designated group of sensors as a single occurrence. These consolidated alarm events are then evaluated for possible Type 1 or Type 2 alarm declaration and Notification as a single event. This function filters out events such as merchandise removal detected on adjacent fixtures and unusual events such as a fork lift striking a fixture outfitted with multiple sensors or even an earthquake shaking all sensors in the store.

The "Stocking Detection" subroutine disables the processing of alarms when merchandise may be being stocked on monitored fixtures. Methods used to enter this mode include designated Time of Day (TOD) day parts (such as when the store is closed), a command from an authorized store employee (such as via a mobile device, network device, or designated button), or automatic detection of store employee presence by video recognition, RFID location, beacons, or similar methods.

"Presence Verification" uses one or more infrared sensors and/or real time video analytics to confirm that one or more persons are present at the alarm location. For example, a sensor may be triggered by interactions on either side (that is, either aisle) that the fixture faces. Presence verification enables the System Controller or MAS devices peer-to-peer collaboration to determine in which aisle the activity actually occurred and to issue a Notification for the appropriate aisle—or no Notification at all if the merchandise in the occupied aisle is not of monitoring interest.

"Sensor Groups" provide a means for summing activity across multiple adjacent/nearby fixtures. While the sensor at each fixture may detect a Type 1 event, collectively these individual events may be upgraded to Type 2 alarm.

"Notification Modulation" avoids the generation of excessive Notifications (especially Type 1 alarms) based on various conditions including TOD Day Part, the amount of shopper traffic in the store (typically detected by entrance/exit sensors), and the amount of store staff available (typically determined through real time clock data). These factors may preclude the issuance of some Notifications and/or may define the minimum time intervals during which Notifications to a given routing destination (such as to personnel serving a specific department) will be launched.

Notifications may route to store personnel via a variety of paths (e.g., overhead speakers, pagers, smart mobile devices, wireless phones, display screens, etc.) and the invention can be configured to escalate notifications if store personnel are expected to respond to these Notifications. Response is determined either by the responding person pressing a button or taking a similar action at the alarm area or can be determined by automatic detection of staff entering the area (typically using video recognition, RFID, beacons, or similar technologies).

Direct Merchandise Attachment:

The primary application of the invention involves mounting the MAS to a store fixture and detecting vibrations induced into the fixture by merchandise movement activity. Another application is to affix the MAS directly to merchandise for the purpose of detecting when that merchandise is being handled. The following are provided as examples only.

Art and Statuette Gallery: A typical commercial art/tourist gallery may have many expensive items on display. It can be difficult for the staff to closely monitor all of the items and avoid the theft of display items, especially during busy times in a sizable gallery, which may have various display rooms. By affixing the MAS to the article or as a base for the article, a wireless alarm identifying the specific item can transmit as soon as someone picks up the item, resulting in Notifications much like those described in this document. For example, the video stream from a video camera trained on that display area could immediately pop up in a back office, behind a sales counter, or to a mobile device. This will permit rapid determination of the likely intent of the person with the merchandise if rapid response to avert a theft is needed or if a more casual shopper engagement approach is desired.

If the MAS is equipped with location awareness technology, as noted previously, then the location of this merchandise as it may be carried through the store/building can also be included in the notifications to personnel, camera systems, and even mapping displays. Further, MAS can declare an alarm condition based on the merchandise entering certain locations (such as approaching an exit area).

Fitness Equipment Assistance: Should a shopper step onto a display tread mill or other fitness equipment, the resulting MAS trigger can summon sales assistance to the location, which would increase shopper engagement at the point of interest and likely increase sales.

Automobile Sales Lot Theft Deterrent: The MAS may be attached to new or used autos in a car lot to detect movement of cars, including jacking up of the car in the course of removal and possible theft of tires (not an infrequent event)—such events then trigger appropriate Notifications. A means of temporarily disabling the alarm may be provided to authorize drivers/technicians. This deterrent can also apply to boats in storage and aircraft.

Practical Examples

Example 1 is illustrated in FIG. 5A wherein a MAS mounted on a store gondola (fixture) detects merchandise movement occurring on either side of the fixture (that is, in both store aisles the fixture faces. In this configuration, Presence Sensors detect if someone is in front of the fixture when merchandise movement is detected. If a person is in the aisle on only one side of the fixture, then the notification message to store personnel will specify only that aisle for the activity alarm location. The filtering decision can occur at the System Controller (receiving transmissions from all devices) or through peer-to-peer collaboration with only the resultant alarm going to the System Controller.

Example 2 is illustrated in FIG. 5B wherein Multiple Merchandise Activity Sensors may be mounted near each other (such as on adjacent store fixtures). This proximity may utilize one of two types of processing:

Duplicate Alarm Filtering: Detection of the same alarm event by more than one MAS is reduced to a single alarm notification.

Alarm Summing: Non-duplicate merchandise activity detected by any one MAS may not exceed the alarm threshold but combined activity by two or more nearby MAS may constitute an alarm.

In both processing types, the reduction to a single alarm event may occur by communication between the MAS devices resulting in the local filtration of the alarm prior to transmission to the System Controller. In the alternative, the reduction to a single alarm event may occur by communication of the duplicate alarms to the System Controller which thereby determines if the activity threshold is met requiring further communication of the alarm event.

Example 3 is illustrated in FIG. 5C wherein the inclusion of a remote annunciator provides three key functions for a cluster of MAS devices: 1) the annunciator can be physically located to optimally provide audio and/or visual alarm annunciation in response to alarm conditions detected by any MAS in the cluster; 2) the annunciator can perform filtering and processing of an alarm event by alarm summing or duplicate alarm consolidation at cluster level; and 3) the annunciator communicates processed alarms to the System Controller and/or directly to a compatible Communication Device, thereby eliminating the need for a System Controller.

Example 4 is illustrated in FIG. 5D wherein a communication device accepts alarm notifications directly from MAS devices, avoiding the need for a System Controller. MAS devices can use peer-to-peer communication and processing to perform alarm filtering and alarm summing, as noted previously.

Precision Targeting of Mobile Content Delivery through Merchandise Interaction

FIG. 6 illustrates a store aisle with shelving on each side and with a proximity beacon installed to provide Location Based Services (LBS) to Smart Phones located anywhere in that aisle. By way of example only, the system of FIG. 6 utilizes a discrete proximity beacon and transmits a signal to a smart phone using Bluetooth Low Energy (BLE), though it is possible that the Beacon could be integrated within a MAS module to further accuracy. Other proximity sensing technologies include, but are not limited to, WiFi having two or more WiFi access points equipped to triangulate to determine approximate location of a mobile wireless device and LED lighting such that store lighting using LED technology can be flashed then sensed by a wireless device's camera to determine approximate location relative to a lighting fixture. LBS beacons are increasingly adopted by retailers to provide a means by which relevant content is sent to a shopper's smart phone based on that shopper's location and, in some cases, a known interest profile.

A key LBS application offers discounts, information, or other inducements to shoppers that is relevant to merchandise located in the aisle at which the shopper is currently located. While prolonged presence in the aisle is a strong indicator of shopper interest, the diversity of merchandise displayed on both sides and throughout the length of the aisle impairs the retailer's ability to zero in on the shopper's precise area of interest. For example, from FIG. 6, it can be determined from the beacon that a given shopper is somewhere in that aisle but it is not known if it is the merchandise on shelving 10A or 10B that is of interest, much less at which portion of the aisle the merchandise of interest may be.

MAS devices mounted to store shelving provides a means of refining the shopper's locations and, more importantly, the specific merchandise of interest. In this scenario, a shopper's approximate location is established by the LBS application through beacon and opt-in app interaction with the shopper's smart phone. Merchandise movement detected by a MAS device is immediately relayed to the store's LBS application which can use this information, perhaps in concert with other contextual data, to determine what specific messaging should be pushed to that shopper.

A given shopper is not definitively identified as the one responsible for MAS-detected interactions, since there may be additional shoppers in the aisle; with or without an active LBS session. In some cases, the LBS application may use Received Signal Strength Indication (RSSI) to determine if (or which) LBS-accessible shopper interacted with merchandise. In others, shopper profile information (such as historical purchasing data) enables LBS message delivery to the appropriate shopper.

Mobile Self-Checkout Non-Purchase Interaction Detection

Many retailers anticipate adopting shopper self-checkout at the point of display using smart phones. Under this concept, a shopper scans merchandise before placing it in their shopping cart or bag. This provides a time savings for the shopper, who no longer needs to wait in line for a cashier or even a self-checkout POS station. It also reduces in-store labor, decreases the amount of in-store POS technology, and frees floor space previously used by POS stations for merchandising purposes. However, these benefits will no doubt be somewhat offset by those taking the increased opportunity to steal merchandise.

Figure 7:
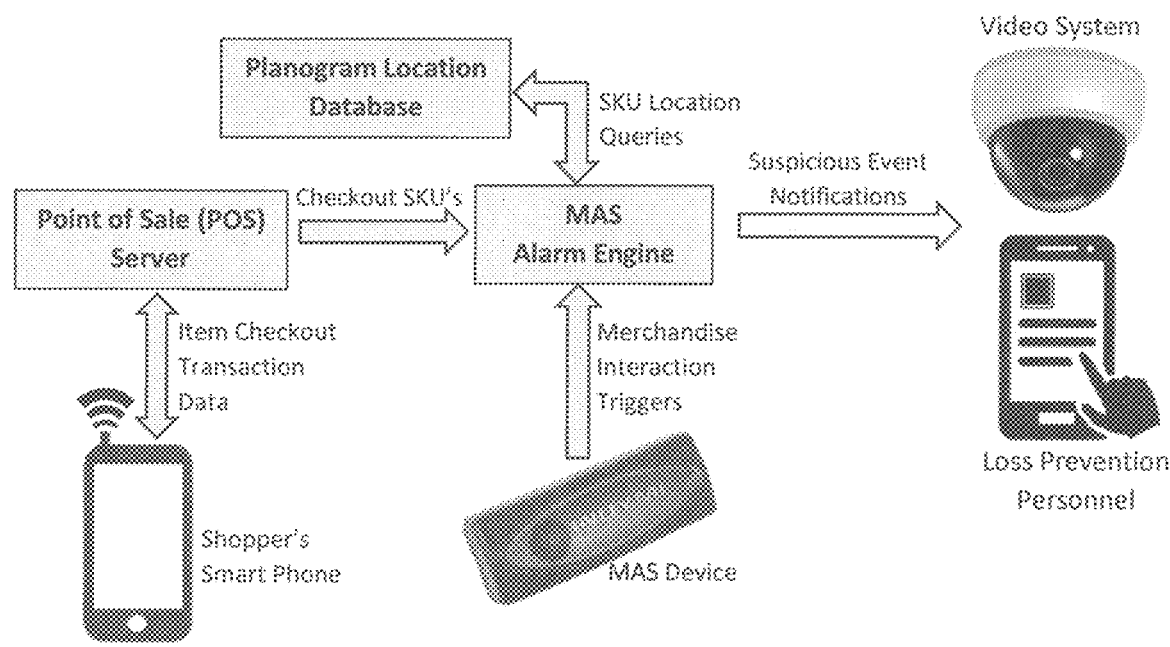
FIG. 7 provides a block diagram illustrating the Mobile Self-Checkout Non-Purchase Interaction Detection.
Figure 8:
FIG. 8 illustrates a typical Public View Monitor (PVM).

The MAS provides a means to effectively detect and deter theft activity in such self-checkout scenarios. Referencing FIG. 7, a preferred sequence of this application functions as follows:
1. Shopper removes desired merchandise from shelf/peg hook; MAS sends Merchandise Interaction Trigger to MAS Alarm Engine.
2. Each merchandise purchase scanned through Shopper's Smart Phone pushes a Checkout SKU (or other identifier) from the POS Server to MAS Alarm Engine.
3. MAS Alarm Engine queries for item location(s) from the Planogram Location Server.
4. MAS Alarm Engine determines if the SKU Planogram Location(s) is within the detection range of one or more open (recent and not cancelled) MAS-detected merchandise interactions and that the merchandise interaction level reasonably correlate with the quantity of items purchased at that location (i.e., if only one item were purchased from the location, then we would expect the sensor activity to likewise detect activity consistent with the removal of a single item):
   a. IF YES: The open MAS-detected merchandise interaction(s) is/are cancelled;
   b. IF NO: A Suspicious Event Notification is generated, the event logged, and the matching merchandise interaction(s) cancelled.
5. Suspicious Event Notifications can be routed to virtually any desired destination and can involve multiple actions and/or media; some examples:
   a. Video Central Monitoring Station: An email or other rapid messaging protocol notifies a monitoring team, which quickly assesses the several seconds of video surrounding the MAS Interaction Trigger to determine if a theft is in process.
   b. Smart Video Monitoring System: The Trigger causes the appropriate video segment (incident location and time frame) to be pushed to a monitoring station, portable smart device, or other destination for immediate review. For example, a Loss Prevention professional in the store could receive the video on his/her mobile device; assess the situation; identify the suspect; and quickly take remedial action.
   c. Audio or Text Notifications: A message identifying the location of the suspicious event can be routed to wireless phones, mobile smart devices, two-way radios, and other communication devices.
   d. Exit Inspection: Either based on a single (probably manually confirmed) suspicious event but more likely due to several suspicious events (suggesting a "suspicious shopper") possibly combined with other contextual information (such as the loyalty status of the shopper), a notification trigger may be routed to a person or system near the exit of the store that would cause an exit inspection of the shopping cart or some other action to confirm that all items in the cart were checked out. As an example of a system, an approaching shopper (detected by their mobile device interacting with proximity detection method) may be signaled by a green light (to continue to exit) or a red light indicating they will need to submit to inspection.

The various functions ascribed to each component in the above sequence could be allocated differently; for example, the POS server database could already include SKU location information and provide it directly to the MAS Alarm Engine with each SKU transaction.

Public View Monitor (PVM) Integration

A typical PVM integrates a camera, infrared presence sensor, audio annunciator, alert light, and video display in a single package suitable for mounting in or above an aisle.

When a person is detected by the presence sensor, the audio annunciator activates (typically a "chime"), the alert light illuminates, and the camera scene observed by the camera (including the detected person) is displayed. This is a proven theft deterrent since the prospective thief assumes he/she is being recorded (though that is actually rarely the case).

A serious deficiency to this scenario is caused by the audio annunciator activating for every passing or browsing person, creating a palpable annoyance factor to shoppers and store personnel alike; this high level of annunciation activity also tends to diminish the deterrence impact of the PVM since it no longer appears targeted in any way.

Integrating the PVM with a MAS mounted on the store fixture holding the merchandise of concern drastically reduces audio annunciation activations to only those interactions in which someone actually moves any of the displayed merchandise. This is accomplished by the mounted MAS detecting merchandise movement exceeding the defined threshold level then sending a trigger to the PVM causing the PVM to activate. MAS activity threshold setting is dependent on the type of merchandise monitored and the way it is displayed. For example, MAS threshold would typically be set to trigger for all interactions of merchandise frequently shoplifted. Conversely, the MAS trigger threshold may be set for prolonged activity at merchandise affixed to locking peg hooks (at which a thief may attempt to cut packaging) or at merchandise at which sweeps (removal of many items during a short time) are a concern.

Correlation of Suspicious Events with Identified Person(s)

Events of Interest (EOI) and Detection of Suspicious Events:

The following activities individually and/or in certain combinations are examples of incidents that may define an EOI:

Merchandise Interaction: The act of removing merchandise, especially, but not limited to, a large quantity of merchandise or expensive merchandise in any quantity, from its point of display is often considered suspicious. Methods of detecting suspicious merchandise movement include, but are not limited to:

Vibration induced into a store fixture when merchandise is moved, such as MAS. Vibration characteristics often enable sensing and processing technology to distinguish between removals of a single item versus a large quantity, the latter typical of an ORC boosting EOI. Detection devices typically use accelerometers as the sensing element together with algorithms distinguishing various types of merchandise interactions.

Some video analytics systems detect presence, absence, and changes to observable displayed inventory. Depending on the nature of the movement and, in some cases, who is present at the time of the change, an EOI may be declared.

Shelf mats using matrixed capacitive, resistive, and/or switch technology are capable of detecting the presence and sometimes approximate weight of merchandise placed upon the mat. Removal of specific items is readily detected and an EOI may be declared based on algorithms analyzing changes in merchandise presence status.

Instrumented restrictive access merchandise fixtures such as single-dispense twist knobs, flip doors, tightly configured merchandise pushers, and similar methods well known to retail loss prevention professionals as methods that restrict removal of merchandise to one or a limited quantity of items within a brief time frame. These fixtures require repetitive actions (e.g., twisting a knob) and/or extended actions (e.g., holding a flip door open) to obtain multiple merchandise items. Exceeding a "dispense" threshold, which may be detected using vibration sensors, position sensors, switch contacts, and other sensors with appropriate algorithms, can constitute an EOI.

Infrared curtains, 3D cameras, and smart video systems are capable of detecting hands entering and leaving a monitored merchandise area and, in some cases, are able to determine if merchandise is actually removed and/or replaced. Algorithms analyzing these actions can declare an EOI.

Radio Frequency Identification (RFID) tags are increasingly attached to or embedded in an item or may be attached to a display fixture such that the tag becomes readable when an item is removed from the fixture. RFID sensors together with supporting algorithms may be used to declare an EOI based on merchandise movement.

Presence: The act of one or more persons remaining in a monitored area of interest for a period exceeding that of a typical shopper can be a suspicious event. Presence sensors utilized throughout the retail environment may be employed to detect the presence of potential persons of interest. Typical location types and methods of detecting such presence include:

Isolated Location: It is suspicious when a person remains longer than usual in an area known to be favored by thieves seeking to covertly strip alarm tags from merchandise and/or stage merchandise for subsequent removal. The most common methods to detect this presence include smart video camera systems (able to detect a person and determine how long that person remains in the prescribed area) and strategically located passive infrared detection devices focused on the area of interest. Post detection algorithms determine when an EOI is declared.

Fitting Rooms: A person remaining in a fitting room longer than a typical shopping visit (sometimes factoring in the quantity of garments known to be taken into the fitting room) can constitute a suspicious event. The privacy of fitting rooms is often used to strip alarm tags and conceal merchandise for subsequent removal from the store. Methods detecting the length of occupancy in fitting rooms include passive infrared detectors, switch contacts associated with door locks, sensing floor mats, and video cameras tracking entry and exit from outside the fitting room. Appropriate algorithms can declare an EOI with any of these sensing methods.

Electronic Article Surveillance (EAS) Alarms: EAS tags placed on or in merchandise is normally removed or disabled during the purchasing process. A tag that has not been deactivated triggers an alarm as it passes detectors (pedestals) typically located at exit doors. Every EAS alarm is considered an EOI; those EAS systems in which store personnel are able to immediately confirm the reason for the alarm (test, missed removal of tag, theft recovery, runaway shoplifter, runaway booster team, etc.) provide additional EOI declaration confirmation.

Radio Frequency Identification (RFID) Tags: RFID tags are increasingly embedded in or attached to merchandise sold in retail stores. Unlike EAS tags, each RFID tag is uniquely identified to facilitate tracking that specific piece of merchandise throughout the supply chain and beyond. Using one or more RFID sensors, an excessive quantity of merchandise removed from a display fixture or taken to a location (such as a fitting room or obscure area known to be used for tag stripping) may be the basis for an EOI.

Exit Doors: Various points of egress including emergency exits, receiving doors, and even trash portals are used by thieves to remove merchandise. Methods used to declare a door opening as unauthorized, and therefore an EOI, include switch contacts at emergency doors and key or code-entry exits at docks and other doors intended for use only by authorized personnel.

Human Observation: While many events are detected by sensing devices, the invention also accepts event reports initiated or confirmed by store staff. For example, a store associate discovering stripped tags in a fitting room could use a mobile smart device or other method to provide event type, location, and approximate time of the incident. Another example, a suspected merchandise boosting event detected by a vibration sensor can subsequently be confirmed with certainty by store personnel. In the first case, the human input caused an EOI to be declared while the second provided certainty of the EOI.

Person Identification:

For purposes of the invention, "identification" does not inherently mean establishing the actual identity (e.g., name) of a person. Rather, it is assigning to a given person a trackable alias (e.g., a unique alphanumeric code) based on the detection of one or more identification markers associated with that person. This alias provides the means for trending data analysis across multiple store visits relevant to a given individual. Identification markers and methods used to detect them include:

Facial Recognition: The ability of smart video systems to uniquely identify a person is well known and can be implemented at store entrances/exits as well as at various locations within a store. Cameras can even be integrated directly with or immediately adjacent to EOI-detecting sensors. Such close proximity has the benefit of linking EOFs only to persons in the immediate vicinity of the EOI or even definitively involved with the actions triggering the EOI. Significantly reducing the population of persons linked to the EOI in this fashion greatly speeds the ability to firmly declare POI.

Cell Phone: Since nearly everyone carries one or more cell phones, the invention can use the unique identifiers transmitted by cell phones to infer the identification of the person carrying it. Methods to identify cell phones include:

MAC Address: Every such wireless device is assigned a unique MAC address not duplicated in any other device anywhere. This address can often be harvested through the device's Wi-Fi or Bluetooth connectivity using a "sniffer" designed for this purpose. One or more sniffers can be installed to harvest addresses across a relatively broad area (such as a sales floor) or at a traffic constriction point (such as an entrance or exit). For example, sniffing MAC addresses at a store exit can provide a very tight linkage between an EAS alarm EOI and a person (carrying that phone) passing through the door at that time.

Beacon Interaction: Many stores offer helpful applications for shoppers to use in their stores. These applications sometimes use beacons (small radio transmitters placed at various locations in the store) to provide micro location-dependent functionality. The ability to then associate a cell phone with a position known to be near a detected EOI provides yet another opportunity for identification and close coupling of the person carrying the phone with an EOI.

RFID Tags: As noted previously, RFID tags are increasingly embedded in merchandise for use throughout the supply chain and beyond (e.g., for warranty purposes). These tags are not disabled at the purchase point and typically remain active in shoes, clothing or other items worn or carried by a person. Using RFID readers at doors or other locations in a store, the invention can use these tags as an identification marker.

License Plate Recognition: Video analytics can capture license plate numbers from vehicles entering and/or leaving the facility parking lot. This vehicle identification can then be linked to an EOI occurring coincident with the vehicle's presence in the parking lot and, through statistical coincidental association, that vehicle could be linked to one or more persons identified through one of the above methods.

Person of Interest (POI) Declaration and Threat Characterization Code (TCC) Assignment The invention uses a highly configurable multi-input processing algorithm to declare a person as a POI in as few visits as possible. This determination is accelerated based on confidence factors associated with the means of detecting the EOI and the person identification marker types. Some factors used in this process include:

Basic trends of identified persons in the vicinity of EOI across one or more store locations Correlation and confidence weighting of various identification marker types assigned to a given person Repetitive, periodic, and time frame factors relevant to persons associated with EOI Apparent repetitive modus operandi attributable to persons associated with the same type of EOI The presence of multiple identified persons (a group) repetitively associated with EOI Event combinations that may collectively constitute an EOI or accelerate POI declaration, such as:

Removal of high value merchandise not followed by a purchase within the item category;

Manual confirmation from a store team member (typically using a mobile smart device) of a boosting incident at a specific location (often in response to a system query triggered by an EOI detection);

A detected removal of multiple merchandise items EOI followed by detected excessive dwell EOI of a person in a nearby isolated location.

A further function of the invention is assignment of a tiered and categorized rating code to each POI, the purpose of which is to assist store team and loss prevention professionals with the ability to triage and assign resources for most impact and to identify the most appropriate response strategy for each situation. The invention provides a highly configurable mechanism for defining both the contents and range of the Threat Characterization Code (TCC) linked to each POI. By example, a typical code may comprise three alphanumeric fields, each of which provides the following characterizations or quantifications:

Financial Impact: Based on actual or estimated value of the loss by this POI per incident and the quantity or frequency of incidents. The resulting code for this impact may be based on such metrics as:

Average $ impact per month (or other interval)

Lifetime $ impact by this POI

Identification Confidence: Since some identification methods are undeniably unique to the individual (like facial recognition) while others are by inference (like cell phone addresses), confidence in POI identification can shape the response strategy of loss prevention professionals.

Modus Operandi: Response actions will be quite different if the POI is a suspected booster team member vs. a habitual cosmetics shoplifter. This "field" provides information on historical detected modus operandi of the POI. This information often expands beyond a field to reveal other historical traits of the POI such as type of merchandise suspected of stealing and dwell locations used in the past.

Alert Notifications and Testimonial Data Harvesting:

The objective of the invention is to provide information used to deter theft or support the apprehension and conviction of suspects. This is accomplished in two basic ways:

Alert Notifications: Store employees, loss prevention professionals, remote video monitoring personnel, and others may be notified in real time of situations warranting their attention. These notifications typically include a just-detected EOI (if any) and/or the presence of a POI together with that POI's TCC. Delivery of such notifications is via known communication devices including telephones, smart wireless devices, computers, electronic tablets, pagers, and radios and are typically triggered in one of two basic situations:

Reactive Notifications: Sent when an EOI has been detected with a POI in the vicinity. This requires loss prevention personnel to implement a response action recognizing an incident is already in progress.

Proactive Notifications: Sent when a POI is detected in the vicinity but not necessarily with a corresponding EOI. This empowers loss prevention personnel (including remote video monitoring station personnel) to observe a possible impending EOI and take appropriate action.

Testimonial Data Harvesting: Since the declaration of a person as a POI is inherently related to a series of incidents, the invention generates reports detailing the EOI related to the POI. This includes what are often highly repetitive modus operandi behaviors and permit ready linkage to videos that further detail incidents involving the POI. When a POI is apprehended, this information provides powerful evidence of a pattern of behavior extending well beyond the singular incident for which the POI was finally charged.

Practical Examples

Use Case 1: Boosters and Cell Phone ID:
Scenario Sensors: MAS, EAS System; Cell Phone Sniffer (at store entrance/exit); EAS Alarm Confirmation Panel MAS detects merchandise interaction above the trigger threshold followed by three members of a booster team exiting the store carrying bags of stolen merchandise causing the exit EAS system to alarm. Since the invention considers all EAS alarms as an EOI, it associates all seven detected cell phones in the vicinity of the store exit with this event. A store employee responding to the EAS alarm uses the EAS Alarm Confirmation Panel to confirm alarm validity and indicates cause as a suspected booster team. The correlation system also associates this information with the event and creates a database for future reference in the case of another event.

Fifteen minutes later, three of the seven cell phones associated with the event are detected entering another store of the same chain. Since the EOI at the first store was manually confirmed as a probable booster team, the appearance of these three phones together results in the correlation system accelerating a POI declaration though only one confirmed EOI has so far occurred. The correlation system immediately pushes a notification to store personnel who may then take actions to observe and deter or apprehend. Additionally, the invention will associate a TCC to each of these POI's indicating a high probable financial impact (typical of boosters), a moderate identification confidence (since identification is solely based on cell phone presence), and modus operandi (booster and possibly merchandise type, if provided).

Use Case 2: Clothing Shoplifter and Facial Recognition:
Scenario Sensors: Facial Recognition System (at store entrance); Fitting Room Inspection Input Device A store employee inspecting a fitting room discovers multiple stripped EAS tags, indicating a recent theft, and registers this discovery (typically through a fitting room management system or smart mobile device). This action often also involves scanning the stripped tags to determine the amount of the loss. Registering the discovery is considered an EOI by the correlation system which then associates the facial recognition code of all persons entering the store within the previous 45 minutes (programmable) with the EOI. Note that this will likely be dozens of persons, nearly all of which have nothing to do with the EOI other than being in the vicinity.

The correlation system then searches prior similar EOI's at this and nearby data-sharing stores comparing persons present at this EOI to those EOI. In this case, one person appears to have been present at one prior EOI and another at three prior EOI. Based on the invention's selected algorithm variables, it declares the latter a POI and assigns a TCC based on estimated financial losses (in part based on scanning of stripped tags), assigns a high identification confidence (since facial recognition was used), and a fitting room modus operandi.

Due to the POI designation, when this person enters a participating store the next time, the correlation system immediately notifies the video monitoring team and the store's loss prevention professionals, who will take actions to observe and deter or apprehend.

Theft Deterrence Through the Use of Interactive Devices

"SmartDome," as used herein, refers to a theft deterrent device that can integrate with MAS and is a simulated surveillance camera that actively responds to theft behaviors. This device consists of several key features including a housing, sensing technology, local audio capabilities, and visual cues. The housing is identifiable as a dome video surveillance camera, of a type typically mounted to a ceiling, or to a pole hanging from the ceiling wherein the system operates within a "dummy dome" camera or equally well integrated into the housing of a real camera. The sensing technology is capable of detecting shopper behaviors, such as dwelling in an area of interest, product removal from shelves, and doors being opened.

The SmartDome embodiment of the invention consists of a housing which is identifiable as a video surveillance camera, which may be in one of many forms. The invention will also operate equally well integrated into a housing of a real video dome camera. The SmartDome further consists of sensing technology capable of detecting real time shopper behaviors using one or more of the following: presence of one or more persons in an area of interest; actual or probable product removal from shelves; and door opening. Another key feature is local audio in the form of one or more sound effects, including voice, to draw attention to the camera when it has "gone active" due to detected suspicious activity and the ability to "escalate" audio notification based on perceived risk level. Visual cues such as steady or flashing lights, which may be multi-colored, for example, blue, green, yellow or red, provide one or more of the following functionality: to visually indicate the camera has gone active; to attract the attention of the thief to look at the camera; to quickly allow store personnel, by observing the device(s) from a distance, to physically locate the zone of suspicious activity and/or the location of shoppers to whom they may offer service; to indicate level or risk or other activity based on color and/or flashing rate of lights; and to infer a direction of interest from the camera's perspective based on detected activity. An optional embodiment integrates into a system capable of notifying store personnel of detected events via various communications devices such as radios, public address systems, and mobile devices.

When an event of interest occurs (such as a suspicious merchandise interaction that may be indicative of theft), SmartDome outputs a tone, sound effect, and/or voice message to draw the thief's attention and one or more lights begin flashing (promoting a perception that observation is occurring by security personnel and recording is in progress). This sound and light also gain the attention of nearby store personnel; SmartDome may also proactively notify store personnel to respond to the area via various communication channels (such as the public address system, pagers, radios, or mobile devices etc.); additionally, a SmartDome imitation camera can notify the store's Video Management System (VMS) of suspicious activity, which can trigger the VMS or the personnel monitoring the VMS to investigate by directing a nearby real PTZ camera to the area of suspicious activity, effectively increasing the monitored range and direction of real cameras at a far lower cost than a plethora of such cameras. These attention-getting features and the actual or possible response of store personnel fundamentally alters the perceived risk of detection and apprehension associated with the camera, making SmartDome significantly more effective at deterring theft than conventional cameras.

In addition to loss prevention benefits, SmartDome can also empower service-oriented stores to efficiently improve customer engagement. It does this by using its lights, sound, and notification capabilities to indicate the presence of one or more persons in the monitored area. By placing a SmartDome above every service-intensive area in a store, personnel can quickly determine the presence of shoppers in those areas by simply observing which SmartDomes are indicating such presence. This function typically activates green lights on SmartDome. If SmartDome is also receiving triggers from devices monitoring merchandise movement on nearby shelves, this information can be used to escalate store personnel awareness of shopper's active interest (by turning the SmartDome lights from green to yellow, for example, or even triggering a notification through various communication channels). Even when used to promote customer engagement, the device remains able to provide loss prevention benefits by drawing the attention of prospective thieves and by escalated audio and light (such as flashing red lights) when suspicious activity, such as possible merchandise sweep activity, is detected.

SmartDome can leverage a variety of sensing technologies to detect activity of interest on a real time basis, filter out certain activities, intelligently disarm and re-arm itself, trigger video recording, and communicate alerts to store associates, including, but not limited to:

1) Store Associate Notification: a means of communicating and ultimately notifying store associates.
2) Walk Through Filtering: a means of calculating the time of dwell in order to avoid activation when a customer is passing through an aisle and not dwelling in front of merchandise.
3) Hold Off Period: a means of disarming the device for a programmable amount of time after an activation to avoid the device activating too frequently during busy hours of the stores.
4) Intelligent Rearm: a means of detecting when an area of interest is void of persons to decide when to "rearm" the detection device.
5) Adjustable configuration based on time of day or day of week: The ability to set filtering parameters based on time of day or day of week or both. This feature allows the activation behavior of the device to be tuned to the predictable and time specific traffic patterns and stocking patterns of the store to avoid unwanted activations.
6) Dynamic deterrent escalation: The ability to deliver multiple successive and increasingly aggressive deterrent responses based on the level of theft behavior being sensed. For example, the initial response to a minor threat could be a simple tone, subsequent to this initial response, an elevated response could be a voice message from the device annunciating "a store associate has been called to this area", a further escalation could be a similar message played over the PA for all to hear, a further escalation could be communicating to store associates to immediately respond directly to the area.
7) Remote Annunciation of a Local Deterrent: a means of remotely activating the audio and visual cues from a location other than where the device is located such as the cashier station or other location in the store. This is useful when a store associate identifies a suspicious person enters the store and approaches valuable merchandise.
8) Remote Disable: a means of disabling the device by an authorized individual to avoid activation during merchandise stocking periods.
9) A means of being triggered by Touch devices (MAS) when product movements are detected.
10) A means of being triggered by any external sensor which can detect shopper behavioral, shopper identity or merchandise movement. Examples of which include: a video camera equipped with video analytics, a video camera equipped with facial recognition, a reed switch which detects cabinet or door openings, a weight sensor which can detect product removal from shelves, RFID sensors which can detect product movements etc.
11) A means of triggering an external deterrent device: Once an activation occurs, the device can trigger an external device that augments the deterrent effect further deters theft. Examples of which include turning on auxiliary lighting to illuminate the area or triggering a Public View Monitor to begin recording.

Descriptions of three key types of such sensing methods follow:

Type 1A: Presence Sensing Trigger (Single Sensor):

Detection of the presence of one or more persons in the detection zone exceeding an adjustable dwell period triggers actions drawing attention to the camera. This detection may be performed using filtered pixel disturbance of the camera image (when a real camera is used), motion detection (e.g., an integral infrared sensor monitoring the area below the device), or other presence sensing methods. The presence sensing mechanism is typically integral to the housing (though one or more remote sensors could be used instead or as well).

Figure 9:
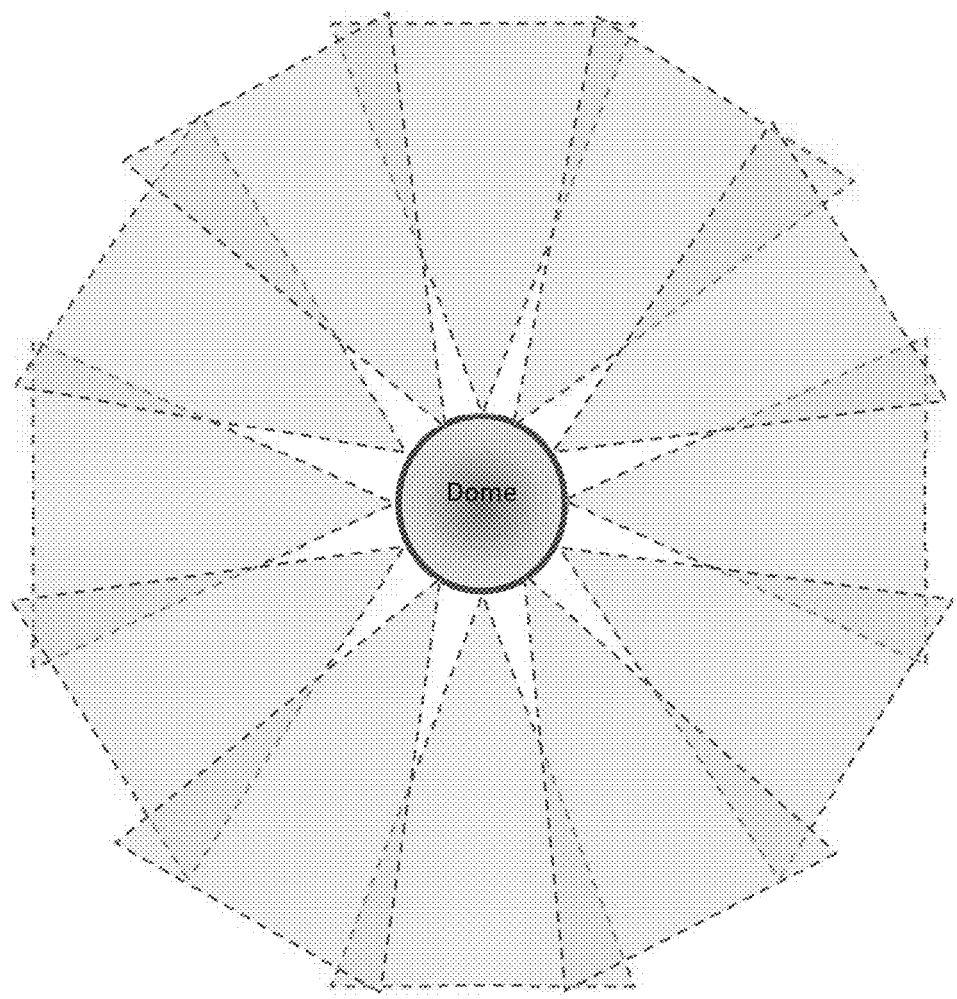
FIG. 9 illustrates a ceiling mounted dome device as viewed from below with 12 presence censors mounted around the radius.

Presence detection typically uses dwell duration to determine activation triggering; that is, detected presence exceeds a defined duration before activation would occur. This is especially valuable in obscure store areas known to be favored by thieves for hiding while removing and secreting tags from merchandise. Once the dwell threshold is reached, the invention, which is typically mounted nearby on the ceiling or other surface/bracket, takes one or more of the following actions to attract attention (these actions apply whether the camera itself is functional or the device is an imitation camera):

Emits an audio signal (beeps, chimes, sound effects, and/or a voice message) to draw the attention of a prospective thief (thieves tend to be much more attuned to even subtle sounds of this nature than a typical shopper would be);

Activates one or more integral lights (such as a ring of LED lights around the base of the dome);

Type 1B: Presence Sensing Trigger (Sector Sensors):

In this embodiment, the device is equipped with multiple presence sensors (typically 4, 8, or 12) arranged to cover radial sectors around the device, as illustrated in FIG. 9.

These sensors provide an indication of presence within a radial node. Using this information, the invention provides the following functionality:

When presence of only one person (or two associated persons) is probable (due to presence detection limited to one detection sector or two adjacent sectors), activation of escalated actions (such as sounds/lights) occurs sooner. Conversely, detection of persons in multiple disparate sectors, indicating a number of shoppers in the area (a situation not as conducive to theft activity), could be the basis to not trigger escalated actions based on dwell alone (as would be the case with Type 1A or if it was likely that only one person was detected in the area);

When so configured, when presence is detected in only one sector, the invention illuminates that portion of a ring of lights located on the base of the dome or inside of the dome corresponding to the direction of detected activity. As presence detection moves from one detection sector to an adjacent sector, SmartDome smoothly transitions the associated lighting based on relative detection levels from each sensor. This apparent tracking heightens the assessed risk level by a thief, providing yet another deterrence incentive.

Type 2: Merchandise Interaction Trigger:

Relies on the detection of actual or likely merchandise interaction, which may be further qualified to trigger action only upon detection of "suspicious" merchandise interactions (e.g., multiple item removal in a short time). When detected merchandise movement exceeds the invention's adjustable threshold, actions drawing attention to the camera, as described previously, are triggered. This type of detection, which is typically not integral to the camera, can include vibration induced on fixtures when merchandise is moved (i.e., Indyme's MAS device), infrared curtains, 3D camera technology, RFID, shelf mats, flip doors, and similar technologies.

An event of interest can be defined to detect normal shopping behavior (such as the movement of a single item of merchandise) or abnormal behavior (such as rapid movement of multiple items of merchandise from the same or a multiplicity of adjacent display fixtures, characteristic of a professional sweep). This adaptability provides an ability to trigger a low level of action (such as just a beep and a flashing light) by the invention for low-risk detections and an escalated level of action (such as a more robust sound effect and a rapid circle of flashing lights) in a probable theft event. This feature can be used to maximize the deterrent effect while minimizing the impact on legitimate customers' experience.

One or more detection technologies and devices can be used concurrently with one or more of the invention camera devices. For example, installing more than one of the inventions in an area of interest can greatly enhance deterrent value by promoting the appearance of thorough area coverage and/or by more than one device reacting to the same or nearby triggers. Likewise, multiple detection sensors permit monitoring merchandise across several displays in the immediate area.

It may also be desirable to combine the Type 1 (Presence Sensing) and Type 2 (Merchandise Interaction) technologies. The most likely use of such a combination would be to trigger the low level action based on presence and the more aggressive action on suspicious merchandise interaction.

When an event of interest is detected by the sensing technology(s), the invention uses one or more of the actions as described in Type 1 above to attract attention, with these notable enhancements:

As noted previously, escalating actions (e.g., more aggressive and/or louder sounds and lights) can be triggered for higher level alarm thresholds (e.g., detection of a suspected sweep activity);

When multiple sensors (Type 1B) are used, SmartDome can automatically adjust merchandise movement risk thresholds based the approximate number of shoppers in the area; for example, modest merchandise movement would be expected when only one or two persons are in the area so a suspected sweep threshold would be quite low; this threshold is higher as the number of shoppers increases;

PTZ Positioning—when using highly visible pan-tilt-zoom cameras, the invention may be programed to automatically re-position the camera to point toward the location of the detected activity (such as the location of the activated MAS sensor(s)).

Store associate notification via multiple devices or communication vehicles.

Activation Filtering to Maximize the Deterrent Effect and Minimize Impact to the Customer Experience The effectiveness of any anti-theft or theft deterrent device is predicated on its ability to responds to events that represent bona-fide suspicious behaviors. Devices that unintelligently or indiscriminately activate prove to be both ineffective at deterring theft and perhaps more importantly, have a very negative effect on the customer experience. It is a general rule in retail the any anti-theft device should not inconvenience 99% of shoppers who are legitimate, to prevent theft from the 1% of shoppers who are bad actors. In addition, store associates must embrace the technology deployed in store. They cannot be annoyed by the device activating unnecessarily when they are simply going about their daily tasks or they will find a way to disable or maliciously destroy the device. This invention employs a number of novel filtering and arming and disarming techniques that significantly enhance the effectiveness of the deterrent effect while also providing a comfortable experience for both legitimate shoppers and store associates alike. It's important to understand that maintaining a comfortable customer experience is a critical, market driven feature of this invention. The following features provide these filtering effects and each feature can be individually be activated or deactivated.

1) Walk through filtering; This filtering technique requires a programmable amount of dwell period to elapse before an activation occurs. This feature allows shoppers to pass through an aisle without activating the device. Only those shoppers who dwell in front of merchandise will activate the deterrent.

2) Hold Off Period: Following an activation, a hold off period is initiated where activations are suppressed for a programmable period of time. This feature is designed to avoid the device activating too frequently during busy hours of the stores. If an activation has just occurred, there is no need to immediately reactivate if presumably the same shopper remains in the detection zone.

3) Intelligent Rearm: In addition to a hold off period, the invention is also capable of suppressing additional activations until the detection zone is void of customers for a period of time. This feature disarms and then rearms the detection device only when an aisle is clear. This feature is used to suppress unnecessary activations while the same shopper remains in the area and rearms the device only when a new shopper enters the area and dwells in front of merchandise of interest.

4) Adjustable configuration based on time of day or day of week: The ability to set any filtering parameter based on time of day or day of week or both. This feature allows any of the activation filtering techniques to be altered based on time of day and/or day of week. This feature is used to tune the behavior of the device to the predictable and time specific traffic patterns and stocking patterns of the store to avoid unwanted activations.
5) Remote Disable: During times when store associates are stocking shelves, an authorized individual can remotely suppress activations to avoid irritating and unnecessary activation during merchandise stocking periods. This feature is important to allow store associates to embrace the technology and not maliciously damage or disable the device to stop it from unnecessarily activating. Malicious damage of poorly designed anti-theft devices is not unusual in a retail environment.
6) Adjustable configuration based on external data inputs: The ability to set any filtering parameter based on external data inputs such as listed below or other external characteristics. This feature allows any of the activation filtering techniques to be altered based on these parameters. Once a trigger is received, the invention evaluates recent alarm activity and various environmental factors to determine what, if any, alarm or staff notification will be issued. These environmental factors may include one or more of the following:
  a. Store Traffic/Occupancy: The store's traffic monitoring system provides real time information on the quantity of persons entering and exiting the store, providing a means of determining the approximate quantity of people in the store at a given time;
  b. Staffing Level by Skillset: The store's time clock system provides information on the quantity of employees by skillset available in the store at a given time;
  c. Facial Recognition: The store's facial recognition system (typically of persons entering the store) can provide notification of the presence of known or suspected high risk individuals;
  d. Mobile Device Recognition: Mobile devices previously detected and associated with suspicious activity in this or other stores indicate the presence of suspected high risk individuals;
  e. License Plate Recognition: Vehicle plates associated with known or suspected high risk individuals or groups entering the store's parking lot;
  f. Regional Activity: Real time sharing of detected theft activity among stores in a geographical area (this may include facial and/or license plate recognition information or may simply be limited to activity related to events of interest, such as likely ORC sweep events);
  g. Event Correlation: Receipt of triggers of other relevant events within a reasonable time proximity; for example, separate nearby merchandise movements that might collectively represent theft sweep activity;
  h. Response Compliance: Some systems incorporate a means of confirming response by store personnel to a detected event; for example, a notification of a sweep event may be sent to store personnel who, upon responding to the area, press a button in that area or are otherwise confirmed to have responded within a reasonable time;
  i. Time of Day/Week/Year: Each of these three timing factors may be taken into account by the invention;
  j. Manual Adjustment: Based on observation or other factors, a manager or other authorized person can direct the invention to increase or decrease the level of aggressiveness of notifications using, for example, a mobile device application or a dedicated infrared control fob.

Variable and/or Escalating Deterrent Based on Risk Level

The invention has a number of ways to increase the aggressiveness of the deterrent response based on the sensor inputs which can assess the threat level sensed. The device can activate mild deterrents when the threat level is mild, and can deploy more aggressive responses as the sensed threat level increases. It can also deliver multiple messages of varying aggressiveness while a shopper continues to dwell in areas of interest. These features are designed to thwart opportunistic shoplifters who are deterred by a mild deterrent as well as professional thieves who need more aggressive responses to abandon their theft. In addition to tailoring the response to the threat, the invention can also optimize for the customer experience. By minimizing the aggressiveness of the response when the sensed risk is low, the impact to legitimate shoppers is also minimized. This escalation can be accomplished in one or more of the following ways:
  1) Flashing LEDs, changing colors, increasing cadence of flash
  2) Audible tone, low or high volume
  3) Audible voice response with custom messages
    a. This voice response can deliver a mild or aggressive message
  4) Play a specific tone or voice message over the public address system
  5) Turn on auxiliary devices such as turn on additional lighting, activate a Public View Monitor to begin recording or other separate deterrent device
  6) Notify store associates or loss prevention professionals to respond to the location of interest PTZ Aiming: A novel feature of the invention is automatic aiming of a real or visible dummy PTZ camera based on the location of the event of interest. Several methods may be used to accomplish this function:
  Integral Motion Sensors: This uses the multiple sensor scheme described for "Type 1B" above. Motion exceeding the dwell time in a single detection segment or adjacent segments causes the camera to orient toward that segment (or a ratio between the two segments) and, should the motion subsequently move to an adjacent segment, to track to that segment to appear to follow the subject. Logic continuously evaluates detection across all segments to provide the most appropriate and natural camera movement.
  External Detectors: Primarily for "Type 2" Merchandise Interaction detection applications, when a qualified event is detected by an external detector (such as a vibration sensor on a shelf unit), the camera orients such that the lens points toward the location of the detected event. Some of the methods which could be used for accomplishing this include:
    Manual Orientation & Trigger: While in programming mode, the PTZ camera is manually positioned (either directly or by manual command through a wireless device) toward the location of the shelf; the sensor on that shelf is then activated to associate that camera position with that sensor. The camera can thus be configured to align to several nearby sensor locations, enabling it to point to any of these locations as needed.
    Radial Point Entry: Azimuth and elevation of the camera can be manually entered (such as through an infrared keypad or other programming device), then associated with an event detector (by manually entering the sensor identification number or by activating the sensor associated with that manually entered location).

Laser Pointer Orientation: While in programming mode, a laser pointer is aimed at the device; sensors in the device detect the laser's azimuth and elevation, causing the PTZ to orient toward that location, at which time the sensor identification is associated with that setting using manual entry or sensor triggering.

Segmented Motion Sensor Alignment: Using the motion sensors described for the Type 1 application, with the device in programming mode, a person stands at the sensor location until the PTZ tracks to that segment, at which time the merchandise interaction sensor is associated to that setting using manual entry or triggering.

SmartDome Example Use Cases

Monitoring Obscure Tag-Stripping Locations (Type 1 Dwell Sensing Only):

A common theft tactic involves removing merchandise to an obscure (low traffic, poor sightline) area in a store where the thief removes anti-theft devices (such as EAS tags, which trigger an alarm when exiting the store) without being discovered. The stripped tags are typically stashed behind other merchandise in the area. The tag-stripped merchandise may be stolen right away or stashed out of sight ("staged") in the area as other merchandise is accumulated to be stolen together.

Store loss prevention professionals eventually discover these stripping locations and the invention provides them with an ideal tool to deter further use of that location for such nefarious activities. Some versions of the invention are battery operated and readily mount anywhere . . . store personnel can easily mount a Type 1 (dwell) version of the product such that the sensor is aimed at the location to be protected. When someone is detected as remaining in the area beyond the selected dwell period, SmartDome makes a brief sound to gain the person's attention, who will then observe one or more lights flashing on the SmartDome, clearly communicating that it would be risky to continue any type of theft activity in that area.

Merchandise Movement Triggered Deterrence (Type 2 Sensing Using MAS):

Combining the invention with merchandise movement sensing devices, such as MAS, provides an even more potent deterrence impact. The variability in actions by the device and store personnel injects a degree of uncertainty into a thief's understanding which, in itself, creates deterrence since risk level becomes difficult to assess. For example, a SmartDome in a high value merchandise area (such as razor blades or baby formula) can be triggered by MAS devices mounted to the fixtures holding these merchandise items. In these locations, which are often plundered by shoplifters (taking one or two items) and professional sweepers (seeking to remove dozens of items), multiple actions may be taken by SmartDome depending on detected activity:

Minor movement typical of normal shopping behavior or shoplifting will trigger a brief sound gaining attention, especially of a hypersensitive thief, who will then see a flashing light on SmartDome. In very high loss situations, the invention's presence detector may be used to trigger this function even before merchandise is moved. This action will often deter a nervous shoplifter;

Atypical multi-item movement across a short period of time that may be indicating a sweep activity triggers a more aggressive audio sound and rapid flashing of several SmartDome lights. This action will deter all but the most serious of perpetrators;

Rapid movement of multiple items that is almost certainly indicating an in-process sweep triggers a voice message from SmartDome, such as "Recording and response are now in process" and possibly followed by a sustained audio sound effect. Clearly, this communicates an immediate and escalated alert level which will cause most any thief to immediately leave. This is also the time when SmartDome messages store personnel of the suspicious activity via an available communication channel or device.

All of these actions and the activity level that triggers them can be selected to best meet each store and merchandise location requirement. However, this use case example illustrates a typical sequence designed to deter and/or limit theft ranging from the casual shoplifter to the professional thief.

Combined Service Engagement and Loss Prevention (Type 1 and 2 Dwell and MAS Sensors):

A typical configuration of the invention would be to both promote customer engagement and reduce theft. In this example, SmartDome is equipped with an array of presence sensors (described as Type 1B above) and a sensor detecting the movement of merchandise on nearby shelves (described as Type 2 above). While SmartDome can trigger staff notifications via various communication channels, just observing the lights on the device provides store staff with insight into activity in the area monitored by the device (indicated colors are configurable and may not match actual functionality in all installations):

NO LIGHT (or BLUE LIGHT): no activity detected;

STEADY GREEN LIGHT: multiple persons detected in the area; low risk; service engagement opportunity;

FLASHING GREEN LIGHT: multiple persons detected in the area; normal shopper merchandise interaction detected; low risk; service engagement opportunity;

STEADY YELLOW LIGHT: likely one person detected in the area; moderate risk; service engagement opportunity;

FLASHING YELLOW LIGHT: likely one person detected in the area; normal shopper merchandise interaction detected; moderate risk; service engagement opportunity;

FLASHING RED LIGHT: suspicious merchandise movement detected; high risk.

The invention can accept suspicious event triggers from virtually any type of device or system capable of detecting events of interest; examples include but are not limited to:

Merchandise Activity Sensors monitoring vibration induced into store fixtures when merchandise is removed;

Cameras & Video Management Systems capable of detecting suspicious behavior (such as unusual loitering);

Infrared Sensors detecting presence dwell (loitering) at high risk locations and reaches into merchandise displays (i.e., an infrared "curtain" detecting merchandise interaction);

3D Camera Systems monitoring removal of merchandise from a store fixture;

Alarmed Display Devices often connected to cameras and other high end items permitting shoppers to pick up the item but that detect if the attached restraint is removed;

Anti-Sweep Devices & Fixtures that limit merchandise activity and/or mechanically monitor merchandise removal (includes instrumented locked dispensing fixtures, twist knob dispensing devices, flip doors, merchandise pushers, and peg hooks);

RFID detecting tag movement from a shelf or a defined area;

Facial recognition cameras which are able to uniquely identify known shoplifters.

Light & Motion and similar devices (outfitted with a transmitter and location awareness technology) mounted to merchandise that detect suspicious handling or, by virtue of numerous such devices subjected to near-simultaneous movement (which may suggest an in-process theft sweep);

Fitting room occupancy sensors;

Shopping cart sensor systems that detect a path to the store exit without a visit to a Point of Sale station;

Unauthorized presence sensors behind jewelry and other service counters; and

Perimeter door switches.

While possible systems configurations and their capabilities vary considerably, once the invention evaluates the event trigger and relevant environmental factors, it determines what action(s) a given event will then trigger. Available actions may include, but are not limited to, one or more of the following:

Local Deterrent Alarm: Sound and/or light in proximity to the suspicious event gains the attention of nearby persons (especially thieves, who are typically hyper alert); these local alarms may be in a variety of form factors including:

Local Annunciator: Essentially a small enclosure with a speaker and lights;

Smart Dome Camera: This could be a real or imitation camera but is outfitted with a speaker and lights;

Smart Public View Monitor (PVM): This video display with integral camera may be activated to take increasingly aggressive sound, light, and video display actions depending on the situation;

In-Store Notifications: All or select store personnel may be notified using various communication channels including Public Address systems, two-way radios, pagers, wireless phones, and mobile smart devices;

Remote Notifications and VMS Integrations: Especially situations in which store video cameras are monitored/analyzed at a remote monitoring station, the invention uses network and other communication channels to notify remote monitoring personnel and/or automated Video Management Systems (VMS).

The primary function of the invention is to:
1. Accept event triggers of interest from each monitored source;
2. Evaluate the nature of the event of interest;
3. Correlate that event with any others that may be relevant;
4. Identify and evaluate the appropriate environmental factors; and
5. Take the appropriate alarm and/or notification action, if any.

While the actual evaluation algorithm is a highly configurable trade secret, Table 1 provides insight on how various environmental factors are considered.

TABLE 1

| Factor | Description | Typical Impact |
| --- | --- | --- |
| Store Traffic | Using store entry traffic count sensors and exit sensors and/or average shopping duration metrics, approximate number of shoppers in the store is determined. | As the ratio of shoppers to available store associates increases (sometimes based on event location and associate skillsets), the threshold to triggering in-store response notifications increases (i.e., notifications will be less likely to trigger). |
| Staffing Level | Using time clock and POS login activity and data, the quantity of available store associates by skillset is determined. | |
| Facial Recognition | Persons entering the store and/or at locations within the store are compared with a database to identify individuals or groups of individuals known or suspected to be involved with theft. | The identification itself may trigger a notification event; additionally, any other events (especially if associated with a past modus operandi, such as the theft of razor blades) will be handled with higher aggressiveness. Two or more persons of interest in close time proximity who were previously detected as a group also increases aggressiveness. |
| Mobile Device Recognition | Similar to facial recognition but identification is made through unique addresses of mobile phones carried by persons of interest. | |
| License Plate Recognition | A camera at the parking lot entrance or other location(s) detects license plate numbers to determine if past events of interest correlate with that plate. | |
| Regional Activity | Nearby stores within a chain or cooperating stores of different chains provide real-time notification of select events of interest (especially theft sweeps likely performed by Organized Retail Crime teams). | As ORC teams often target a series of nearby stores - typically sweeping the same items - awareness of a likely team operating nearby increases alarm and notification aggressiveness. |
| Event Correlation | All event triggers received within a reasonable time frame are evaluated for possible correlation with each other. | If individual events are determined to likely correlate to a suspicious activity, action aggressiveness increases. |

TABLE 1-continued

| Factor | Description | Typical Impact |
| --- | --- | --- |
| Response Compliance | Confirmation of store personnel responding to an event of interest in a timely fashion.* | Poor compliance will typically increase notification aggressiveness (e.g., reducing the threshold justifying a notification and speeding escalations to management). |
| Time of Day/Week/Year | Identifying time frames during which specific system actions are desired (e.g., high/medium/low event action aggressiveness); these are often related to anticipated shopper traffic, staffing levels, and known theft vulnerability (perhaps only in specified store zones). | The algorithm uses the specified action level as a final consideration as to what, if any, action(s) will be taken in response to a given event). |
| Manual Adjustment | Authorized personnel (such as store management) temporarily adjust notification aggressiveness based on conditions. | Aggressiveness adjusts for a specified duration of time. |

*A variety of methods can be used to confirm response to an event of interest. Proactive methods include pressing a button or scanning a bar code located in that area, among other similar methods. Automated methods include video or beacon detection of the presence of a responding employee.

One embodiment of MAS provides detection of merchandise interaction activity to alert store employees of possible shopper engagement opportunities that could result in building sales through up-sell/cross-sell efforts. When monitoring merchandise pushers, a single MAS detects each merchandise dispense and differentiates this from a stocking event. Additionally, when the last item in a facing pusher dispenses, MAS detects this and can provide notification of the stock-out incident.

In another embodiment, MAS provides detection of suspicious merchandise interaction activity to increase store staff awareness that can help reduce actual theft from the store (shrink).

In still another embodiment, MAS further provides collection of merchandise interaction activity data for use in merchandising study analytics used typically for evaluating effectiveness of new displays, positioning, and packaging.

In yet another embodiment, MAS reduces wait time of customers and delivery persons by summoning assistance to locked doors and counter windows such that the knocking on a door or window triggers staff notifications.

In still a further embodiment, MAS provides a system capable of filtering duplicate alarm events locally at the sensor level or at the system controller level.

In another embodiment, MAS provides a system capable of summing alarm events to detect if the combination of non-duplicate alarms meet a preset threshold requiring further transmission to a communication device wherein summing may occur locally at the sensor level or at the System Controller level.

In still another embodiment, MAS provides a system capable of monitoring a store microenvironment, such as an aisle, using an array of beacons and sensors located in the environment to identify the presence of customers in a given aisle and subsequent customer interaction with specific merchandise resulting in a predetermined action. In a preferred embodiment, the sensing of a customer over a prolonged period of time may result in the notification of a sales associate that a customer needs assistance or in the alternative is possible suspicious behavior. In another preferred embodiment, the detection of merchandise movement by the MAS system may result in opt-in shoppers receiving highly relevant coupons and/or product information directly to their smart phone while browsing the product.

In yet a further embodiment, MAS provides a means for retailers to detect possible in-process theft incidents in a smart phone self-checkout environment.

In still another embodiment, MAS greatly increases the shrink deterrence effectiveness of Public View Monitors (PVM's) by limiting activation to only those times in which someone actually interacts with the merchandise of concern.

One embodiment of the correlation system provides a system capable of the identification of one or more persons in a retail environment associated with a detected suspicious incident, such as rapid removal of a large quantity of merchandise from a shelf, for example detected by MAS.

In a preferred embodiment, the correlation system collects a plurality of inputs based on customer behavior while concurrently collecting a plurality of person specific unique identifiers for individuals present when potentially suspicious behavior occurs. In a more preferred embodiment, the inputs may include, but are not limited to, MAS alarms, PVM activation and cellular GPS signals.

In another embodiment, the correlation system is a statistical model capable of collecting an unlimited number of variables describing customer behavior and interpreting said variables in order to correlate identified events with people present during said events.

In another embodiment, the correlation system consults an associated database following each new logged event and recognizes trends correlating the repeated presence of identified person(s) with coincident EOI across multiple visits at one or more store locations resulting in a declaration of the identified person(s) as a POI.

In still another embodiment, the correlation system assigns each POI a threat rating driven by degree of POI certainty and associated loss level estimated by, for example, theft per visit, frequency of visits and total history of attributable incidents.

It will be appreciated that details of the foregoing embodiments, given for purposes of illustration, are not to be construed as limiting the scope of the invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is further defined in the converted utility application and appended claims. Further, it is recognized that many embodiments may be conceived that do not achieve all the advantages of some embodiments, particularly preferred embodiments, yet the absence of a particular advantage shall not be construed to necessarily mean that such an embodiment is outside the scope of the present invention.

The invention claimed is:

1. An overhead, active deterrent system to reduce theft in a retail environment comprising:
   a housing identifiable as a dome style video surveillance camera;
   a sensing technology;
   at least one local audio capability;
   at least one visual cue;
   microprocessor; and
   at least one algorithm that filters data according to criteria programed by a user in order to identify occurrences of interest and intelligently suppress redundant activations;
   wherein the microprocessor has the capability to accept inputs from external theft detection devices;
   wherein the microprocessor has the capability to provide outputs to external theft deterrent devices; and
   wherein the microprocessor has an optional capability to notify store associates, wherein the at least one algorithm provides multiple filtering and activation suppression functions, the functions comprising:
   a) calculates a length of time a customer is present and determines whether the customer is passing through an aisle and not dwelling in front of merchandise;
   b) provides a hold off period which suppresses activations for a programmable period of time;
   c) provides an intelligent re-arm function which, following the hold off period, uses the sensing technology to detect if the area of interest remains occupied, and
   d) if the area of interest remains occupied, the algorithm will continue to hold off further activations until the area is clear of activity.

2. The overhead, active deterrent system of claim 1, wherein the sensing technology includes a presence detection feature capable of detecting the presence of an individual based on one or more of the following occurrences: presence of one or more persons in an area of interest; and actual or probable product removal from shelves.

3. The overhead, active deterrent system of claim 2, wherein data of occurrences detected by the sensing technology is communicated to the microprocessor.

4. The overhead, active deterrent system of claim 1, wherein filtered occurrences of interest trigger the microprocessor to instruct the overhead, active deterrent system to turn on the local audio and/or visual cue.

5. A system for deterring theft in an environment, the system comprising:
   a) at least one overhead sensor;
   b) a microprocessor having an application capable of processing data acquired by a);
   c) a wired or wireless communication feature capable of communicating the data detected by the overhead sensor to the microprocessor of b); and
   (d) at least one algorithm used by the microprocessor, which provides multiple filtering and activation suppression functions, the functions comprising:
   1) calculates a length of time a customer is present and determines whether the customer is passing through an aisle and not dwelling in front of merchandise;
   2) provides a hold off period which suppresses activations for a programmable period of time;
   3) provides an intelligent re-arm function which, following the hold off period, uses the sensing technology to detect if the area of interest remains occupied, and
   4) if the area of interest remains occupied, the algorithm will continue to hold off further activations until the area is clear of activity, further wherein the at least one algorithm filters data according to criteria programed by a user in order to identify occurrences of interest and intelligently suppress redundant activations.

6. The system of claim 5, wherein the at least one overhead sensor is comprised of:
   a) a housing;
   b) a sensing technology;
   c) at least one local audio capability; and
   d) at least one visual cue.

7. The system of claim 6, wherein the housing is a dome camera.

8. The system of claim 6, wherein the sensing technology is comprised of at least one behavior detection sensor for identifying the behavior of an individual.

9. The system of claim 8, wherein the behavior detection sensor is capable of detecting real time shopper behaviors using at least one behavior selected from the group consisting of presence of one or more persons in an area of interest, actual product removal from shelves, probable product removal from shelves and door opening.

10. The system of claim 6, wherein the at least one local audio capacity is capable of escalation in response to a perceived risk level.

11. The system of claim 6, wherein the visual cue performs at least one function selected from the group consisting of visually indicating the camera has gone active, attracting the attention of a thief to look at the device, allowing store personnel observing the device(s) from a distance to physically locate the zone of suspicious activity and/or the location of shoppers to whom they may offer service, indicating the level of risk or other activity based on color and/or flashing rate of lights, and inferring a direction of interest from the device's perspective based on detected activity.

12. The system of claim 8, wherein the microprocessor analyzes the behavior sensed in order to determine the nature of the behavior as suspicious or non-suspicious.

13. The system of claim 12, wherein the determination of suspicious behavior results in the logging of the event by the microprocessor as an event of interest in a database.

14. The system of claim 13, wherein the system can communicate with the in-store video management system and bookmark recorded video related to a detected suspicious event.

15. The overhead, active deterrent system of claim 6, wherein the audio, visual cues and notification of store associates can be escalated based on the input the microprocessor receives from external theft detection devices.

* * * * *